(12) United States Patent
Campbell et al.

(10) Patent No.: US 11,520,626 B2
(45) Date of Patent: Dec. 6, 2022

(54) QUEUEING TECHNIQUES FOR A SHARED COMPUTER RESOURCE

(71) Applicant: Arm Limited, Cambridge (GB)

(72) Inventors: Michael Andrew Campbell, Waterbeach (GB); Peter Owen Hawkins, Cambridge (GB); David Joseph Hawkins, Austin, TX (US)

(73) Assignee: Arm Limited, Cambridge (GB)

( * ) Notice: Subject to any disclaimer, the term of this patent is extended or adjusted under 35 U.S.C. 154(b) by 261 days.

(21) Appl. No.: 17/028,422

(22) Filed: Sep. 22, 2020

(65) Prior Publication Data

US 2022/0091886 A1 Mar. 24, 2022

(51) Int. Cl.
*G06F 9/46* (2006.01)
*G06F 9/48* (2006.01)
*G06F 9/54* (2006.01)
*G06F 9/52* (2006.01)
*G06F 9/50* (2006.01)

(52) U.S. Cl.
CPC .......... *G06F 9/4887* (2013.01); *G06F 9/5038* (2013.01); *G06F 9/52* (2013.01); *G06F 9/546* (2013.01)

(58) Field of Classification Search
CPC ........ G06F 9/4887; G06F 9/5038; G06F 9/52; G06F 9/546
See application file for complete search history.

*Primary Examiner* — Gregory A Kessler
(74) *Attorney, Agent, or Firm* — Leveque Intellectual Property Law, P.C.

(57) ABSTRACT

A method and system for an enhanced weighted fair queuing technique for a resource are provided. A plurality of request streams is received at a requestor, each request stream including request messages from a process executing on the requestor. The request messages of each request stream are apportioned to an input queue associated with the request stream; each input queue has a weight. A virtual finish time is determined for each request message based, at least in part, on the weights of the input queues. A sequence of request messages is determined based, at least in part, on the virtual finish times of the request messages. The sequence of request messages is enqueued into an output queue. The sequence of request messages is sent to a resource, over a connection, which provides a service for each process.

20 Claims, 12 Drawing Sheets

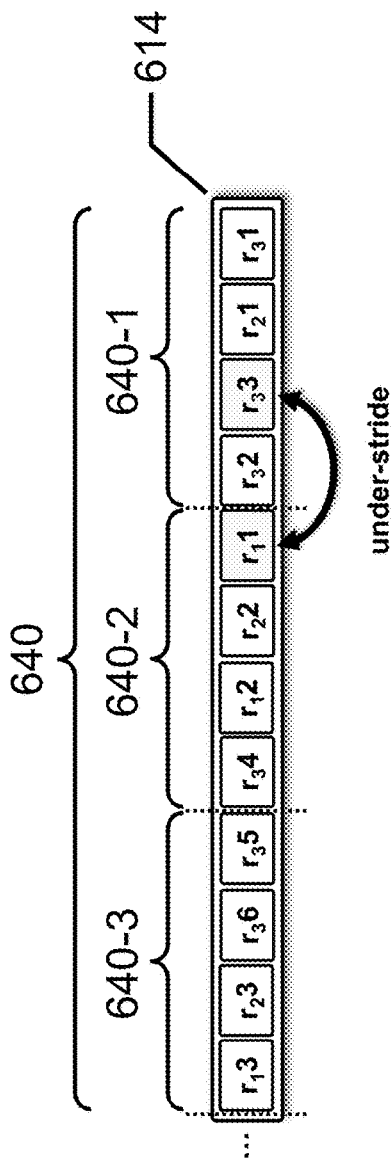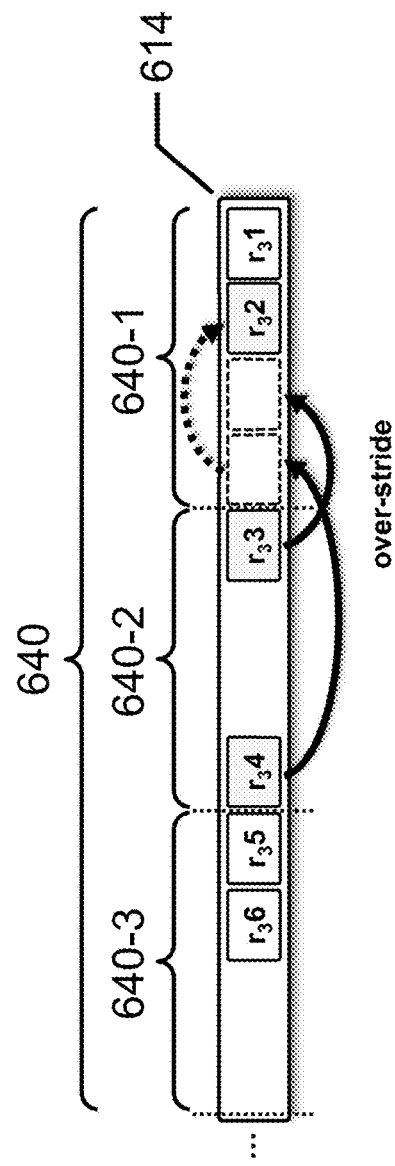
FIG. 9
FIG. 10

QUEUEING TECHNIQUES FOR A SHARED COMPUTER RESOURCE

BACKGROUND

The present disclosure relates to computers. More particularly, the present disclosure relates to shared computer resources.

Generally, a shared computer resource provides a service in response to requests from other processes or components of a system. A resource may be shared in many different contexts, such as, for example, a memory in a system-on-chip (SoC), a memory in a traditional desktop or laptop computer, a file server coupled to a network, etc. Many different types of resources may be shared, such as, for example, static and dynamic memory resources, data storage resources, processing resources, network communications resources, input/output (I/O) resources, file servers, database servers, etc. Depending on the context, conflict over access to a resource may be managed using various synchronization mechanisms, such as, for example, locks, binary locks or semaphores, mutually exclusive locks or mutexes, queues and queue management techniques, network schedulers, traffic shaping techniques, etc.

One queue management technique is fair queuing, which, as the name suggests, attempts to provide fair access to a resource. Fair queueing may be used in many different contexts, as discussed above, and may apply different types of "fairness," such as, for example, round-robin, min-max, worst-case, index-based, etc. Generally, fair queuing provides an equal distribution of service to the requesters, regardless of data packet size or number of requests. Weighted fair queuing is an extension of fair queuing, in which the distribution of service is provided to the requesters on a weighted basis rather than an equal basis. Weighted fair queuing assumes that a resource has a constant data, line or processing rate, R. However, in complex, resource-sharing systems, weighted fair queueing may inadequately address many issues, such as, for example, resource processing rate variability, resource attribute sensitivity, cross-stream interference, etc.

BRIEF DESCRIPTION OF THE DRAWINGS

FIG. 9 depicts a block diagram of an output queue for an enhanced weighted fair queueing technique for a resource, in accordance with an embodiment of the present disclosure.

FIG. 10 depicts a block diagram of an output queue for an enhanced weighted fair queueing technique for a resource, in accordance with an embodiment of the present disclosure.

DETAILED DESCRIPTION

Figure 1:
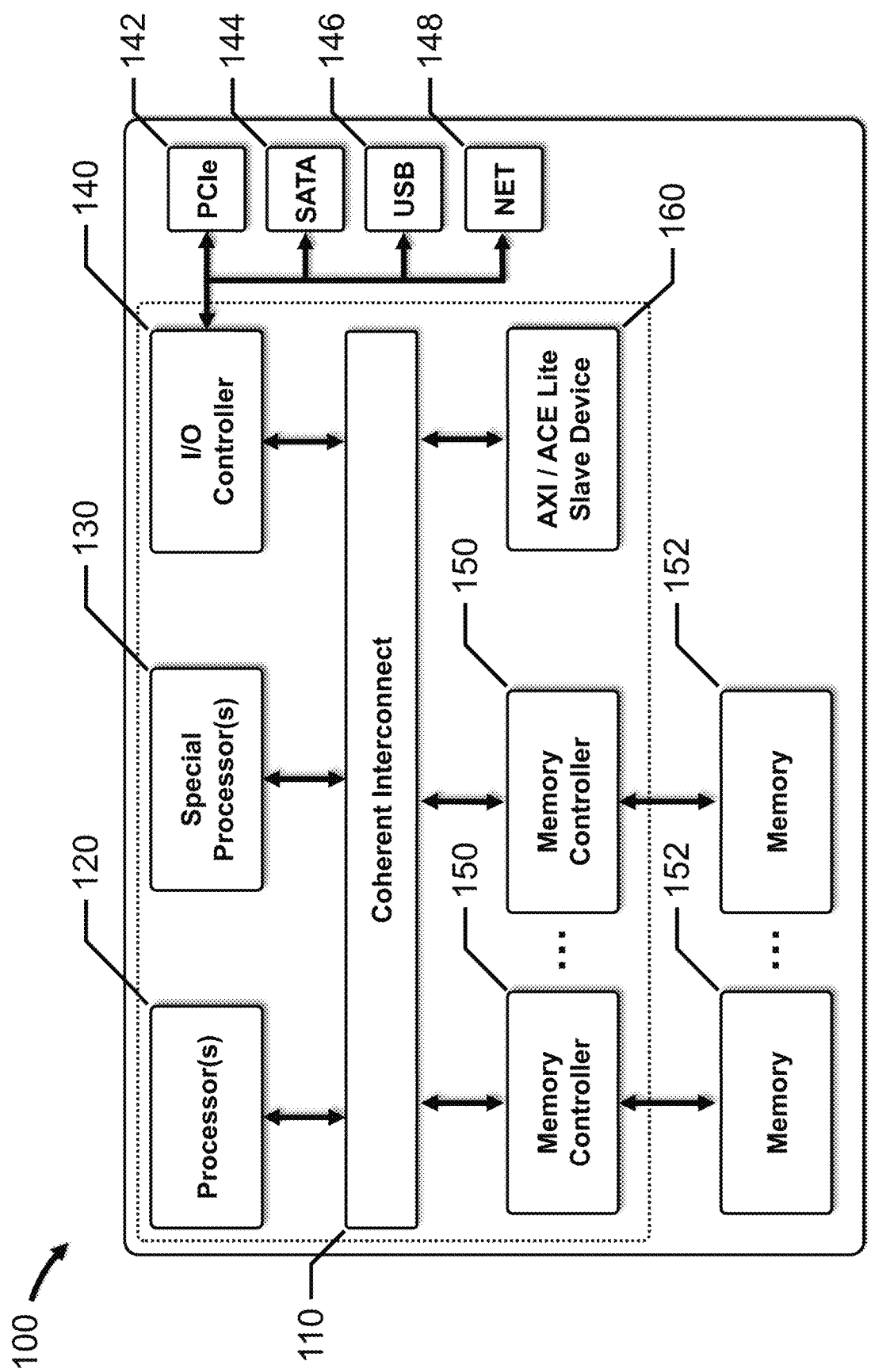
FIG. 1 depicts a block diagram of a SoC, in accordance with embodiments of the present disclosure.

Embodiments of the present disclosure will now be described with reference to the drawing figures, in which like reference numerals refer to like parts throughout.

Embodiments of the present disclosure advantageously provide an enhanced weighted fair queuing technique for a resource that, inter alia, stores the virtual finish times at the requestor rather than the resource to overcome many of the problems described above, such as, for example, resource processing rate variability, resource attribute sensitivity, cross-stream interference, etc.

In one embodiment, a method for an enhanced weighted fair queuing technique for a resource is provided. A plurality of request streams is received at a requestor, each request stream including request messages from a process executing on the requestor. The request messages of each request stream are apportioned to an input queue associated with the request stream; each input queue has a weight. A virtual finish time is determined for each request message based, at least in part, on the weights of the input queues. A sequence of request messages is determined based, at least in part, on the virtual finish times of the request messages. The sequence of request messages is enqueued into an output queue. The sequence of request messages is sent to a resource, over a connection, which provides a service for each process.

FIG. 1 depicts a block diagram for a SoC 100, in accordance with an embodiment of the present disclosure.

In this embodiment, SoC 100 includes interconnect 110, one or more processors 120, one or more accelerators or special processors 130, I/O controller 140, one or more memory controllers 150, an Advanced eXtensible Interface (AXI) or AXI coherency extensions (ACE) Lite slave device 160, etc. Each memory controller 150 is coupled to a memory 152.

Interconnect 110 is a communication system that transfers data between processor 120, special processor 130, I/O controller 140, memory controllers 150 and AXI/ACE Lite slave device 160, as well as other components (not depicted for clarity). Each component of SoC 100 that is coupled to interconnect 110 may be a requester, a completer or a slave, and may be classified as a particular type of interconnect protocol node.

Generally, interconnect 110 may include, inter alia, a shared or hierarchical bus, a crossbar switch, a packet-based serialized network-on-chip (NoC), etc. In one embodiment, interconnect 110 has a crossbar topology that provides an ordered network with low latency, and may be particularly suitable for a small-sized interconnect with a small number of protocol nodes, switches and wire counts. In another embodiment, interconnect 110 has a ring topology that balances wiring efficiency with latency, which increases linearly with the number of protocol nodes, and may be particularly suitable for a medium-sized interconnect. In a further embodiment, interconnect 110 has a mesh topology that has more wires to provide greater bandwidth, is modular and easily scalable by adding more rows and columns of switches or routers, and may be particularly suitable for a large-sized interconnect.

In many embodiments, interconnect 110 is a coherent mesh network that includes multiple switches or router logic modules (routers) arranged in a two-dimensional rectangular mesh topology, such as, for example, the Arm CoreLink Coherent Mesh Network. In this example, the switches or routers are crosspoints (i.e., XPs). Each XP may connect up to four neighboring XPs using mesh ports, and may connect to one or two components (devices) using device ports. Additionally, each XP may support four coherent hub interface (CHI) channels to transport data from a source device to a destination or target device, as described, for example, in the Arm Advanced Microcontroller Bus Architecture 5 (AMBA 5) CHI specification.

In these embodiments, interconnect 110 may have an architecture that includes three layers, i.e., an upper protocol layer, a middle network layer, and a lower link layer. The protocol layer generates and processes requests and responses at the protocol nodes, defines the permitted cache state transitions at the protocol nodes that include caches, defines the transaction flows for each request type, and manages the protocol level flow control. The network layer packetizes the protocol message, determines, and adds to the packet, the source and target node IDs required to route the packet over interconnect 110 to the required destination. The link layer provides flow control between components, and manages link channels to provide deadlock free switching across interconnect 110.

Processor 120 is a general-purpose, central processing unit (CPU) that executes instructions to perform various functions for SoC 100, such as, for example, control, computation, input/output, etc. More particularly, processor 120 may include a single processor core or multiple processor cores, which may be arranged in a processor cluster, such as, for example the Arm Cortex A, R and M families of processors. Generally, processor 120 may execute computer programs or modules, such as an operating system, application software, other software modules, etc., stored within a memory, such as, for example, memory 152. Processor 120 may also include local cache memory.

Accelerator or special processor 130 is a specialized processor that is optimized to perform a specific function, such as process graphics, images and/or multimedia data, process digital signal data, process artificial neural network data, etc. For example, special processor 130 may be a graphics processing unit (GPU), a digital signal processor (DSP), a neural processing unit (NPU), etc. More particularly, special processor 130 may include a single processor core or multiple processor cores, such as, for example the Arm *Mali* family of GPUs, display processors and video processors, the Arm Machine Learning processor, etc. Special processor 130 may also include local cache memory.

I/O controller 140 includes a microprocessor, microcontroller, application specific integrated circuit (ASIC), field programmable gate array (FPGA), etc., and is configured to transmit data to and from various networks or communication buses using wired and/or wireless connections, including, for example, peripheral component interface express (PCIe) bus 142, serial advanced technology attachment (SATA) bus 144, universal serial bus (USB) 146, network interface 148, etc. Network interface 148 may be coupled to one or more local area networks, wide area networks, the Internet, etc., which may execute various network protocols, such as, for example, wired and/or wireless Ethernet, Bluetooth, etc. These networks may include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc. In certain embodiments, I/O controller 140 is a system memory management unit (SMMU), such as, for example, the Arm CoreLink MMU family. In other embodiments, I/O controller 140 includes an Arm CoreLink MMU, which is coupled to PCIe bus 142 and network interface 148, and an Arm CoreLink Network Interconnect (NIC), which is coupled to SATA bus 144 and USB 146.

Memory controller 150 includes a microprocessor, microcontroller, application specific integrated circuit (ASIC), field programmable gate array (FPGA), etc., and is configured to provide access to memory 152 through interconnect 110. Memory 152 may include a variety of non-transitory computer-readable medium that may be accessed by the other components of SoC 100, such as processor 120, special processor 130, I/O controller 140, etc. For example, memory 152 may store data and instructions for execution by processor 120, special processor 130, etc. In various embodiments, memory 152 may include volatile and non-volatile medium, non-removable medium and/or removable medium. For example, memory 152 may include any combination of random access memory (RAM), dynamic RAM (DRAM), double data rate (DDR) DRAM or synchronous DRAM (SDRAM), static RAM (SRAM), read only memory (ROM), flash memory, cache memory, and/or any other type of non-transitory computer-readable medium. In certain embodiments, memory controller 150 is a dynamic memory controller that provides data transfers to and from high-density DDR3 or DDR4 DRAM memory, such as, for example, the Arm CoreLink Dynamic Memory Controller (DMC) family, each of which includes a fast, single-port CHI channel interface for connecting to interconnect 110.

Generally, AXI/ACE Lite slave device 160 is a memory or memory-mapped device that includes a microprocessor, microcontroller, application specific integrated circuit (ASIC), field programmable gate array (FPGA), etc., that is configured to transmit and/or receive data. In certain embodiments, AXI/ACE Lite slave device 160 is a peripheral, and in other embodiments, AXI/ACE Lite slave device 160 is a memory.

The aspects of the present disclosure may be advantageously applied to the resources of system 100 that provide services in response to requests from other components.

Figure 2:
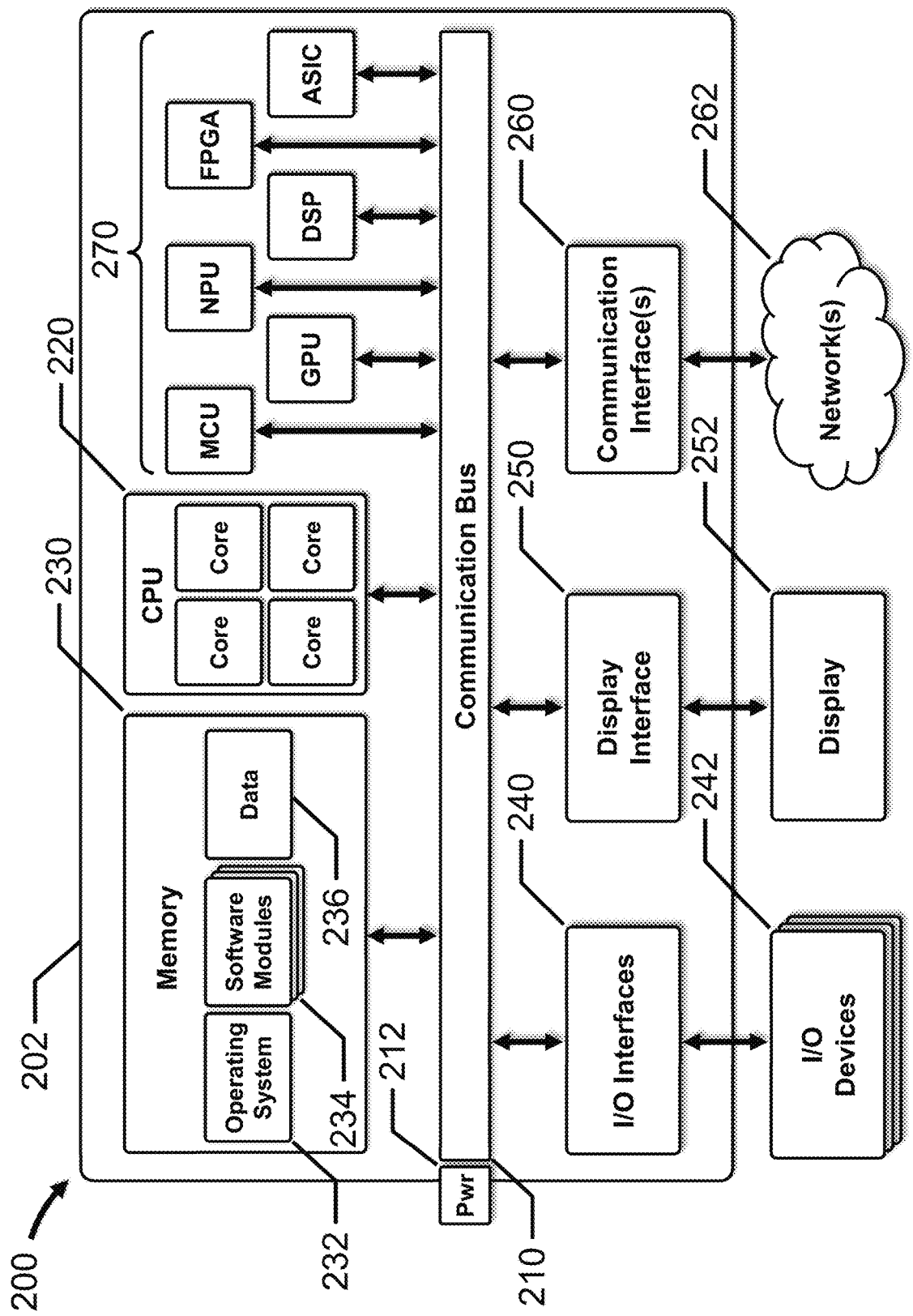
FIG. 2 depicts a block diagram of a computer system, in accordance with embodiments of the present disclosure.

FIG. 2 depicts a block diagram of system 100, in accordance with embodiments of the present disclosure.

System 200 includes computer 202, I/O devices 242 and display 252. Computer 202 includes communication bus 210 coupled to one or more processors 220, memory 230, I/O interfaces 240, display interface 250, one or more communication interfaces 260, and one or more HAs 270. Generally, I/O interfaces 240 are coupled to I/O devices 242 using a wired or wireless connection, display interface 250 is coupled to display 252, and communication interface 260 is connected to network 262 using a wired or wireless connection. In some embodiments, certain components of computer 202 are implemented as a system-on-chip (SoC); in other embodiments, computer 202 may be hosted on a traditional printed circuit board, motherboard, etc.

Figure 3:
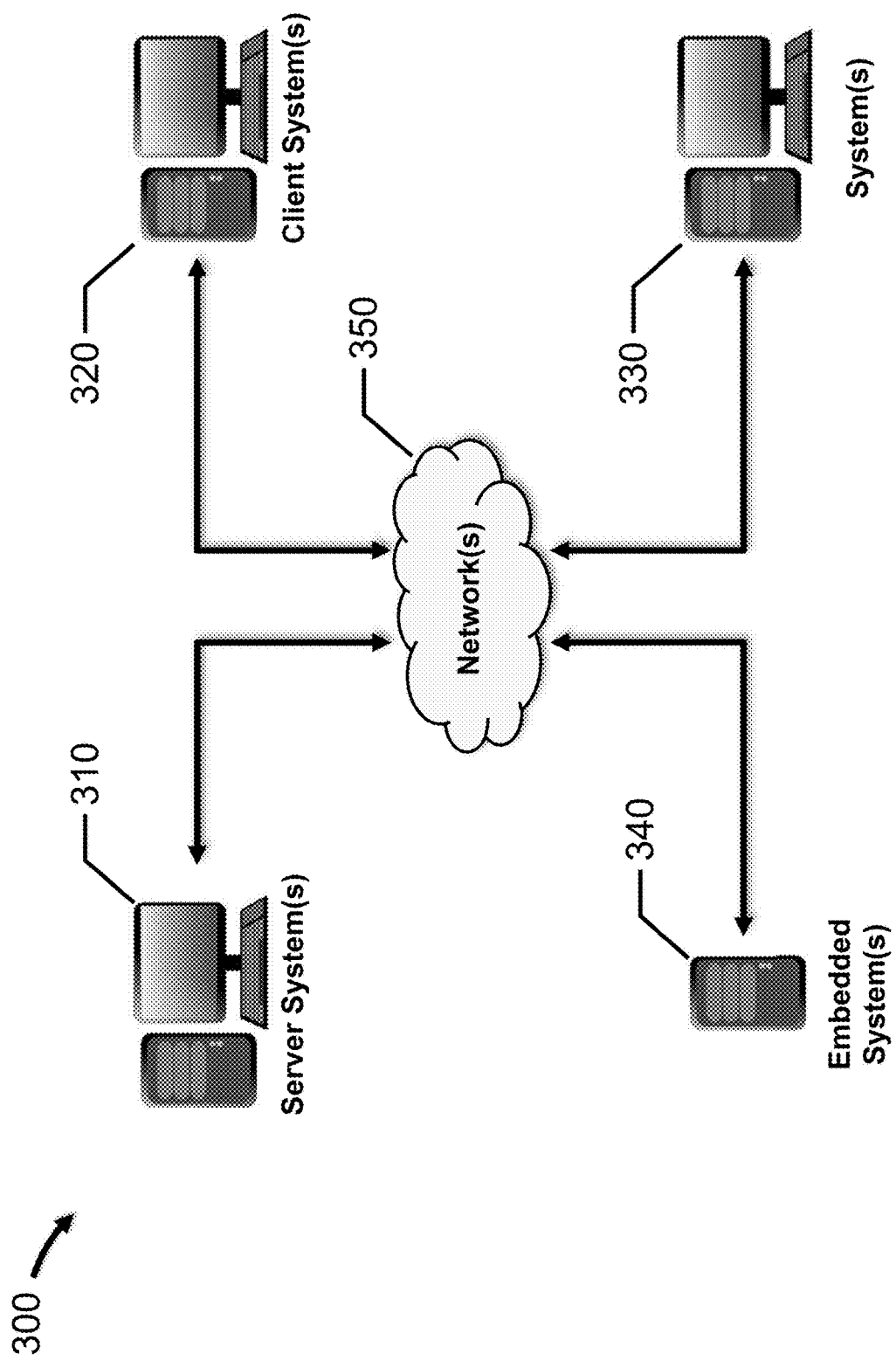
FIG. 3 depicts a block diagram of a system, in accordance with embodiments of the present disclosure.

In some embodiments, system 200 is an embedded system in which one or more of the components depicted in FIG. 3 are not present, such as, for example, I/O interfaces 240, I/O devices 242, display interface 250, display 252, etc. Additionally, certain components, when present, may be optimized based on various design constraints, such as, for example, power, area, etc., such as, for example, HA 270.

Communication bus 210 is a communication system that transfers data between processor 220, memory 230, I/O interfaces 240, display interface 250, communication interface 260, HAs 270, as well as other components not depicted in FIG. 3. Power connector 212 is coupled to communication bus 210 and a power supply (not shown). In some embodiments, communication bus 210 is a network-on-chip (NoC).

Processor 220 includes one or more general-purpose or application-specific microprocessors that executes instructions to perform control, computation, input/output, etc. functions for system 200. Processor 220 may include a single integrated circuit, such as a micro-processing device, or multiple integrated circuit devices and/or circuit boards working in cooperation to accomplish the functions of processor 220. Additionally, processor 220 may include multiple processing cores, as depicted in FIG. 3. Generally, system 200 may include one or more processors 220, each containing one or more processing cores as well as various other modules.

In some embodiments, system 200 may include 2 processors 220, each containing multiple processing cores. For example, one processor 220 may be a high performance processor containing 4 "big" processing cores, e.g., Arm Cortex-A73, Cortex-A75, Cortex-A76, etc., while the other processor 220 may be a high efficiency processor containing 4 "little" processing cores, e.g., Arm Cortex-53, Arm Cortex-55, etc. In this example, the "big" processing cores include a memory management unit (MMU). In other embodiments, system 200 may be an embedded system that includes a single processor 220 with one or more processing cores, such as, for example, an Arm Cortex-M core. In these embodiments, processor 220 typically includes a memory protection unit (MPU). Generally, processor 220 executes computer programs or modules, such as operating system 232, software modules 234, etc., stored within memory 230.

Generally, storage element or memory 230 stores instructions for execution by processor 220 and data. Memory 230 may include a variety of non-transitory computer-readable medium that may be accessed by processor 220. In various embodiments, memory 230 may include volatile and non-volatile medium, non-removable medium and/or removable medium. For example, memory 230 may include any combination of random access memory (RAM), DRAM, SRAM, ROM, flash memory, cache memory, and/or any other type of non-transitory computer-readable medium.

Memory 230 contains various components for retrieving, presenting, modifying, and storing data. For example, memory 230 stores software modules that provide functionality when executed by processor 220. The software modules include operating system 232 that provides operating system functionality for system 200. Software modules 234 provide various functionality, such as image classification using CNNs, etc. Data 236 may include data associated with operating system 232, software modules 234, etc.

I/O interfaces 240 are configured to transmit and/or receive data from I/O devices 242. I/O interfaces 240 enable connectivity between processor 220 and I/O devices 242 by encoding data to be sent from processor 220 to I/O devices 242, and decoding data received from I/O devices 242 for processor 220. Generally, data may be sent over wired and/or wireless connections. For example, I/O interfaces 240 may include one or more wired communications interfaces, such as USB, Ethernet, etc., and/or one or more wireless communications interfaces, coupled to one or more antennas, such as WiFi, Bluetooth, cellular, etc.

Generally, I/O devices 242 provide input to system 200 and/or output from system 200. As discussed above, I/O devices 242 are operably connected to system 200 using a wired and/or wireless connection. I/O devices 242 may include a local processor coupled to a communication interface that is configured to communicate with system 200 using the wired and/or wireless connection. For example, I/O devices 242 may include a keyboard, mouse, touch pad, joystick, etc., sensors, actuators, etc.

Display interface 250 is configured to transmit image data from system 200 to monitor or display 252.

Communication interface 260 is configured to transmit data to and from network 262 using one or more wired and/or wireless connections. Network 262 may include one or more local area networks, wide area networks, the Internet, etc., which may execute various network protocols, such as, for example, wired and/or wireless Ethernet, Bluetooth, etc. Network 262 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

Generally, HAs 270 provide data processing support to various applications embodied by software modules 234, including, inter alia, classification networks, such as, for example, artificial neural networks (ANNs), convolutional neural networks (CNNs), etc. An HA 270 may include one or more processors, coprocessors, processing engines (PEs), compute engines (CEs), etc., such as, for example, CPUs, GPUs, NPUs (e.g., the ARM ML Processor), DSPs, field programmable gate arrays (FPGAs), application specific integrated circuits (ASICs), controllers, microcontrollers, matrix multiplier circuits, multiply-and-accumulate (MAC) arrays, etc. An HA 270 may also include a communication bus interface as well as non-volatile and/or volatile memories, such as, for example, ROM, flash memory, SRAM, DRAM, etc. In many embodiments, an HA 270 may include a SoC, such as SoC 100.

For example, the ARM ML Processor supports a variety of ANNs, CNNs etc., for classification, object detection, image enhancements, speech recognition and natural language understanding, etc. The ARM ML Processor includes a control unit, a direct memory access (DMA) engine, local memory and 16 CEs. Each CE includes, inter alia, a MAC engine that performs convolution operations, a programmable layer engine (PLE), local SRAM, a weight decoder, a control unit, a direct memory access (DMA) engine, etc. Each MAC engine performs up to eight 16-wide dot products with accumulation. Generally, the PLE performs non-convolution operations, such as, for example, pooling operations, ReLU activations, etc. Each CE receives input feature maps (IFMs) and weights sets over the NoC and stores them in local SRAM. The MAC engine and PLE process the IFMs to generate the output feature maps (OFMs), which are also stored in local SRAM prior to transmission over the NoC.

The aspects of the present disclosure may be advantageously applied to system 200, such as the resources of computer 202 that provide services in response to requests from other components, as well as to the resources of HA 270 that provide services in response to requests from other components.

FIG. 3 depicts a block diagram of system 300, in accordance with embodiments of the present disclosure.

System 300 includes one or more server systems 310, one or more client systems 320, one or more systems 330, one or more embedded systems 340, etc., each coupled to one or more networks 350. Server system 310 may execute a server application, such as an application server, a database server, a file server, a web server, an HTTP server, etc., to which client system 320 may connect through network 350. Client system 320 may request relevant services from server system 310 using a client-server architecture, such as, for example, web services. Generally, system 330 may request services from, and/or provide services to, server system 310, client system 320 and embedded system 340, while embedded system 340 may request services from, and/or provide services to, server system 310, client system 320 and system 330.

The aspects of the present disclosure may be advantageously applied to the resources of system 300 that provide services in response to requests from other components.

Figure 4:
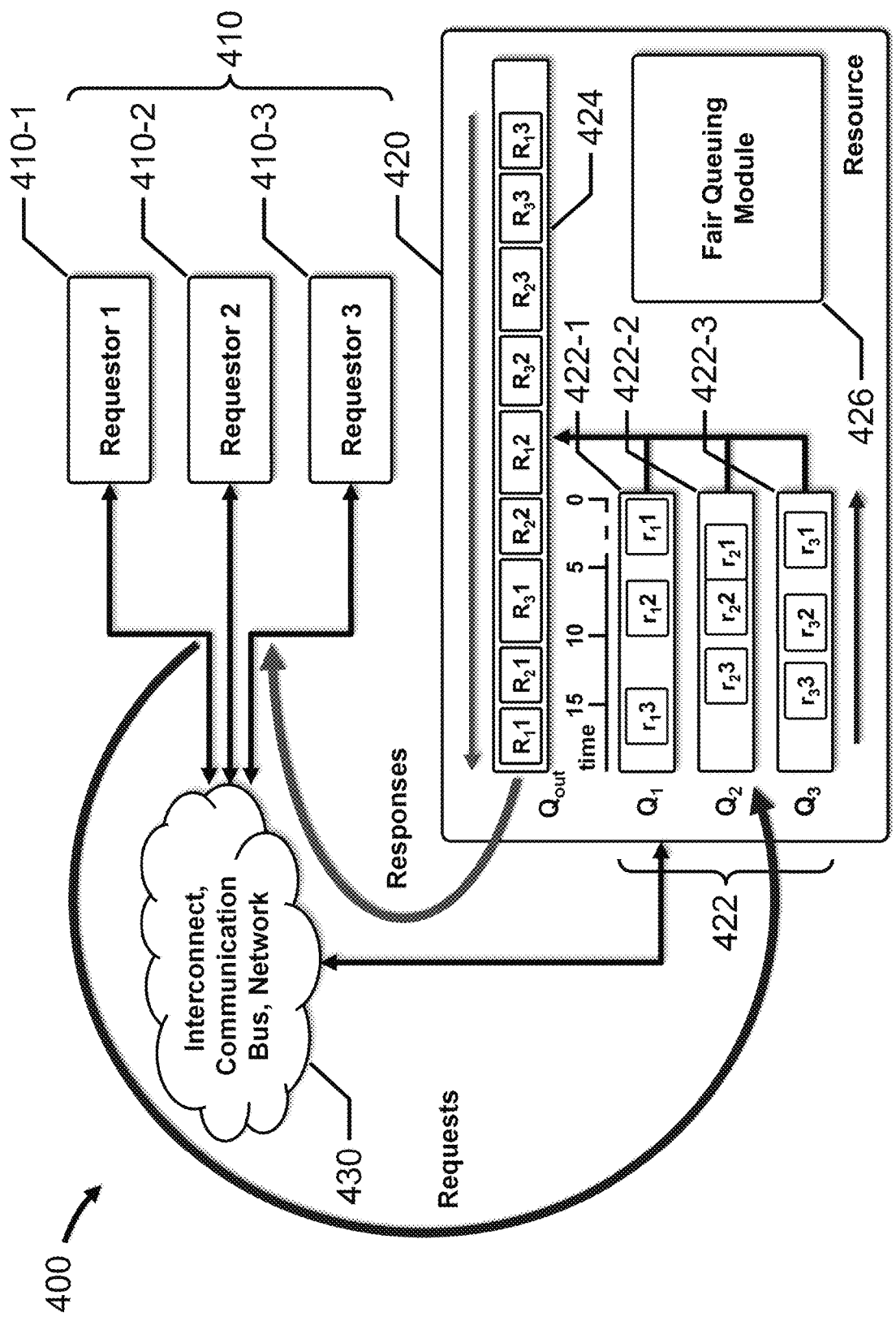
FIG. 4 depicts a block diagram of a fair queuing technique for a resource.

FIG. 4 depicts a block diagram 400 of a fair queuing technique for a resource.

Block diagram 400 depicts requestors 410 and resource 420 coupled to interconnect, communication bus or network 430, such as interconnect 110, communication bus 210, network 350, etc. Each requestor 410 generates a request stream that includes a sequence of request messages that are sent to resource 420 over interconnect, communication bus or network 430. Resource 420 receives the sequence of request messages from each requestor 410, performs the services requested by the request messages, generates and then returns response messages to each requestor 410 over interconnect, communication bus or network 430.

In this embodiment, requestors 410 include requestor 410-1, requestor 410-2 and requestor 410-3; other numbers of requestors 410 are also contemplated. Requestor 410-1, requestor 410-2 and requestor 410-3 may be different threads, processes, applications, etc., executing on a single processor or controller within SoC 100, such as, for example, processor 120, specialized processor 130, I/O controller 140, AXI/ACE Lite Slave Device 160, etc., a single processor or controller within system 200, such as, for example, processor 220, I/O interfaces 240, display interface 250, communication interface 260, HAs 270, etc., a single processor or controller within system 300, such as, for example, a single processor or controller within server system 310, a single processor or controller within client system 320, a single processor or controller within system 330, a single processor or controller within embedded system 340, etc. Alternatively, one or more requestors 410 may be executing on different processors or controllers within SoC 100, system 200, or system 300.

Resource 420 provides a service to requestors 410, such as, for example, data storage and retrieval provided by memory controller 150 within SoC 100, data storage and retrieval provided by memory 230 within system 200, data storage and retrieval provided by a memory within server system 310, etc. Resource 420 includes, inter alia, input queues 422, output queue 424, and fair queuing module 426. Input queues 422 include an input queue for each request stream from requestors 410, i.e., input queue 422-1 for the request stream from requestor 410-1, input queue 422-2 for the request stream from requestor 410-2 and input queue 422-3 for the request stream from requestor 410-3.

Fair queuing module 426 determines the order in which the request messages within each input queue 422 are serviced and the order in which the response messages are provided to output queue 424. The response messages are generally created and provided to output queue 424 in the order in which the request messages are serviced. Fair queuing module 426 may be a software module, a hardware module or a combination thereof.

As discussed above, fair queuing attempts to provide an equal distribution of service to requesters 410, regardless of the service requested or the number of request messages.

In many embodiments, block diagram 400 represents a fair queuing method for reading a memory, in which each request message includes a memory read request, and each response message includes a memory read response. In the example depicted in FIG. 4, input queue 422-1 has received and enqueued three request messages from requestor 410-1, i.e., $r_1 1$, $r_1 2$ and $r_1 3$. Similarly, input queue 422-2 has received and enqueued three request messages from requestor 410-2, i.e., $r_2 1$, $r_2 2$ and $r_2 3$, and input queue 422-3 has received and enqueued three request messages from requestor 410-3, i.e., $r_3 1$, $r_3 2$ and $r_3 3$. While the length of each request message is generally the same, the lengths of the respective response messages, i.e., $R_1 1$, $R_1 2$, $R_1 3$, $R_2 1$, $R_2 2$, $R_2 3$, $R_3 1$, $R_3 2$ and $R_3 3$, vary in length depending on the amount of data requested.

In certain embodiments, fair queuing module 426 determines a virtual finish time for a request message at time t (i.e., $T_{VF}(t)$) based on the arrival time of the request message (i.e., $T_A(t)$), the virtual finish time of the immediately preceding request message (i.e., $T_{VF}(t-1)$), and the length of the response message (i.e., $L_t$), as provided by Equation 1. Fair queuing module 426 then identifies, selects and enqueues the request message from the requestors 410 which has the earliest anticipated completion time.

$$T_{VF}(t) = \text{MAX}(T_A(t), T_{VF}(t-1)) + L_t \qquad \text{Eq. 1.}$$

Table 1 presents the normalized arrival time of each request message, the respective length of each response message and the order in which the response messages are enqueued into output queue 424. Under this technique, fair queuing module 426 services each input queue 422 in rotation to provide an equal fraction of the resource. In this example, the request messages are received in the following order, i.e., $r_1 1$, $r_3 1$, $r_2 1$, $r_1 2$, $r_2 2$, $r_3 2$, $r_2 3$, $r_3 3$ and $r_1 3$, and the response messages are enqueued in the following order, $R_1 1$, $R_2 1$, $R_3 1$, $R_2 2$, $R_1 2$, $R_3 2$, $R_2 3$, $R_3 3$ and $R_1 3$.

TABLE 1

| Request Message | Arrival Time | Response Message | Response Length | $T_{VF}$ | Response Order |
|---|---|---|---|---|---|
| $r_1 1$ | 0 | $R_1 1$ | 4 | 4 | 1 |
| $r_1 2$ | 6 | $R_1 2$ | 6 | 12 | 5 |
| $r_1 3$ | 14 | $R_1 3$ | 4 | 18 | 9 |
| $r_2 1$ | 2 | $R_2 1$ | 4 | 6 | 2 |
| $r_2 2$ | 6 | $R_2 2$ | 4 | 10 | 4 |
| $r_2 3$ | 11 | $R_2 3$ | 6 | 17 | 7 |
| $r_3 1$ | 1 | $R_3 1$ | 6 | 7 | 3 |
| $r_3 2$ | 7 | $R_3 2$ | 5 | 12 | 6 |
| $r_3 3$ | 12 | $R_3 3$ | 5 | 17 | 8 |

Fair queueing may be useful for building predictable networks in simple systems. However, in complex, resource-sharing systems, fair queueing may inadequately address many issues, such as, for example, resource data, line or processing rate variability, resource attribute sensitivity, cross-stream interference, etc.

Figure 5A:
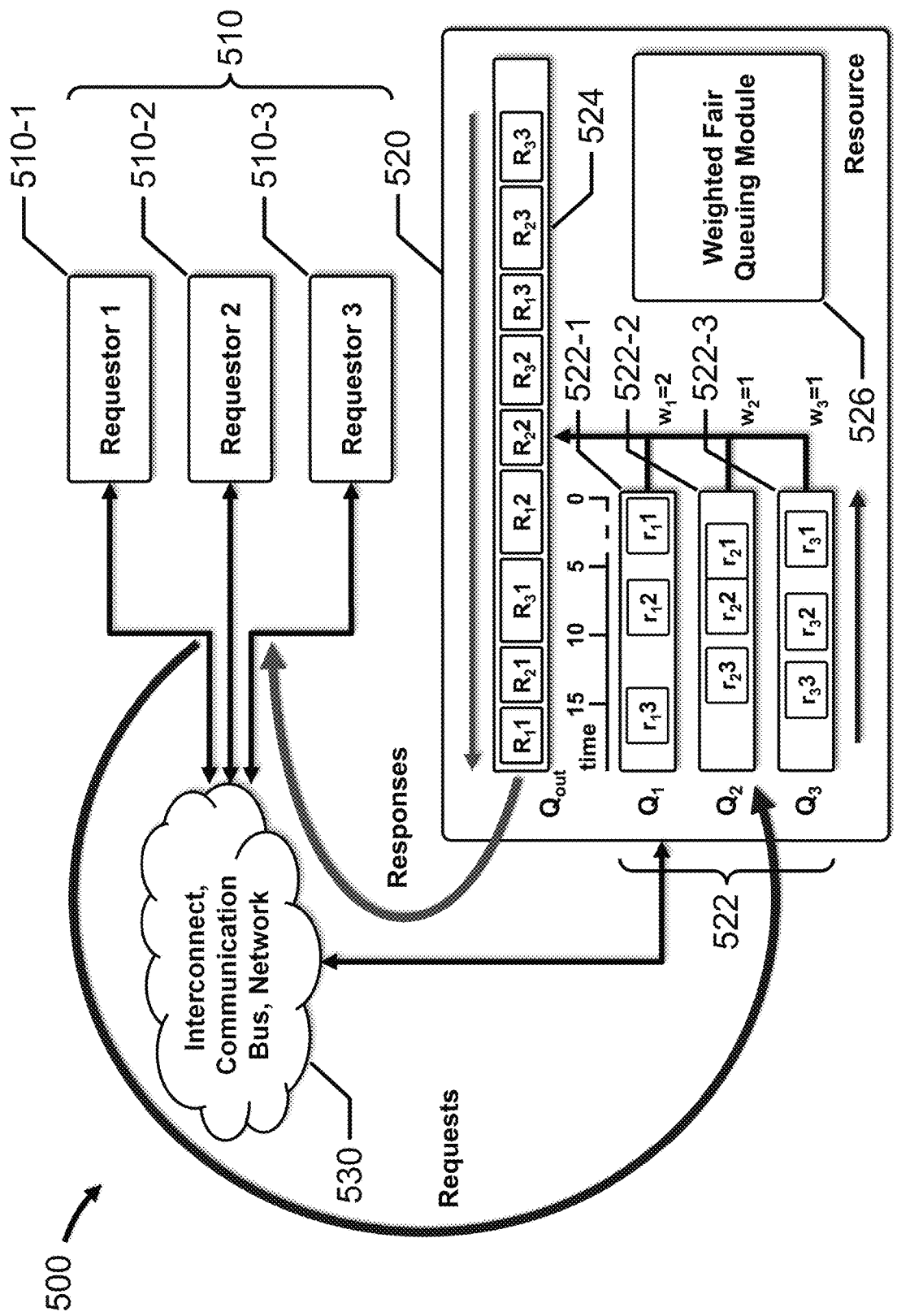
FIGS. 5A, 5B and 5C depict block diagrams of a weighted fair queuing technique for a resource.
Figure 5B:
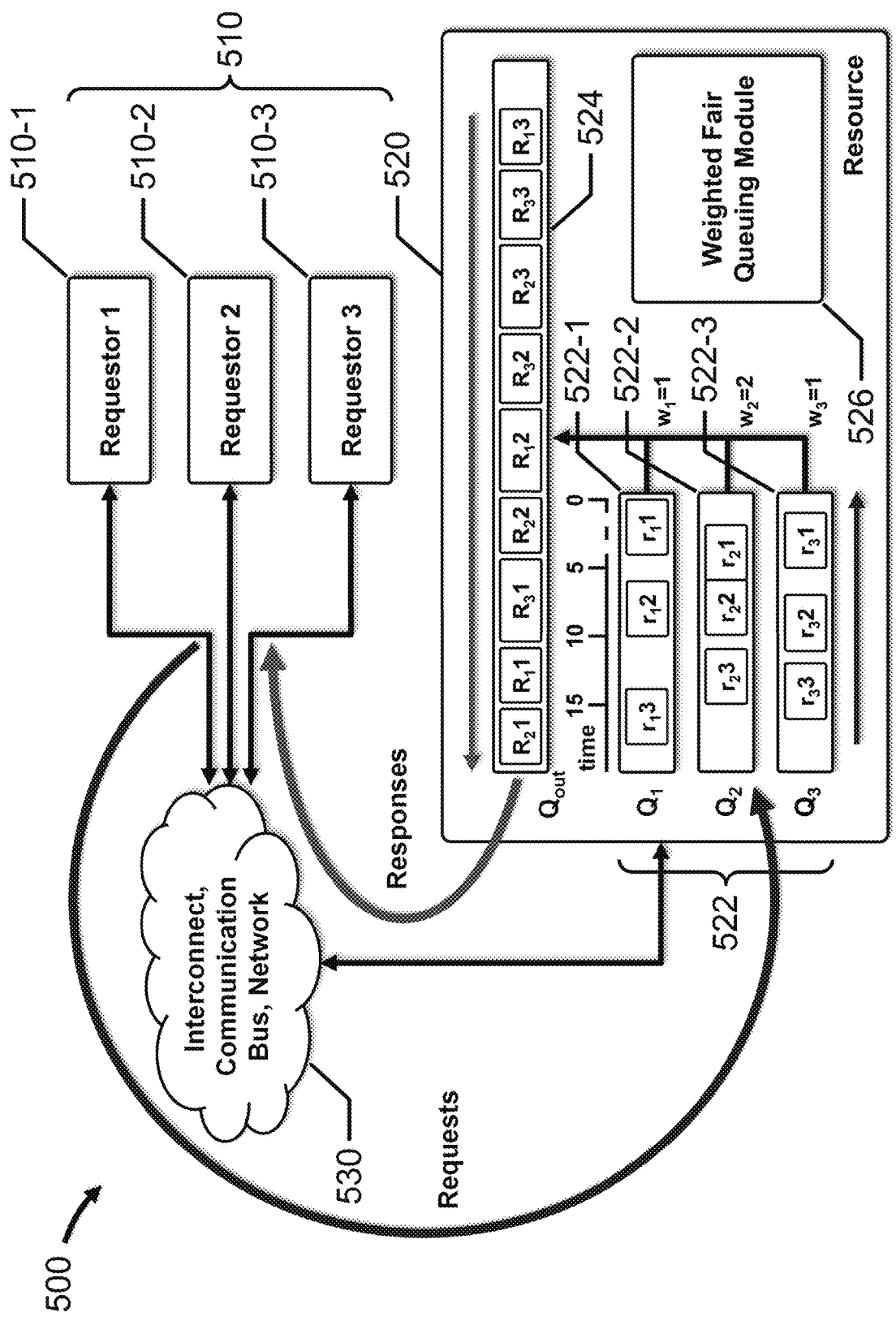
Figure 5C:
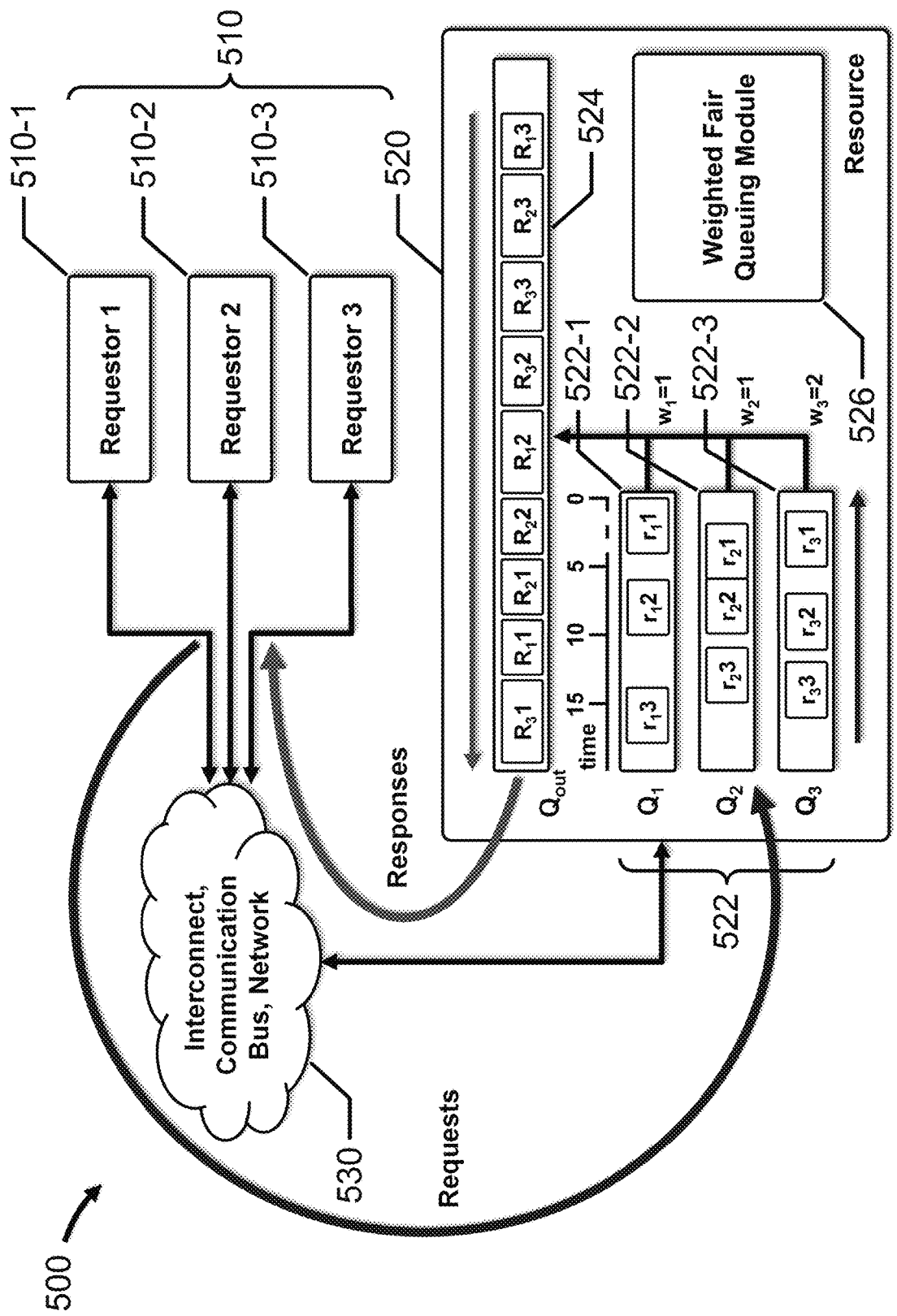

FIGS. 5A, 5B and 5C depicts a block diagram 500 of a weighted fair queuing technique for a resource.

Similar to block diagram 500, block diagram 500 depicts requestors 510 and resource 520 coupled to interconnect, communication bus or network 530, such as interconnect 110, communication bus 210, network 350, etc. Each requestor 510 generates a request stream that includes a sequence of request messages that are sent to resource 520 over interconnect, communication bus or network 530. Resource 520 receives the sequence of request messages from each requestor 510, performs the services requested by the request messages, generates and then returns response messages to each requestor 510 over interconnect, communication bus or network 530.

In this embodiment, requestors 510 include requestor 510-1, requestor 510-2 and requestor 510-3; other numbers of requestors 510 are also contemplated. Requestor 510-1, requestor 510-2 and requestor 510-3 may be different threads, processes, applications, etc., executing on a single processor or controller within SoC 100, such as, for example, processor 120, specialized processor 130, I/O controller 140, AXI/ACE Lite Slave Device 160, etc., a single processor or controller within system 200, such as, for example, processor 220, I/O interfaces 240, display interface 250, communication interface 260, HAs 270, etc., a single processor or controller within system 300, such as, for example, a single processor or controller within server system 310, a single processor or controller within client system 320, a single processor or controller within system 330, a single processor or controller within embedded system 340, etc. Alternatively, one or more requestors 510 may be executing on different processors or controllers within SoC 100, system 200, or system 300.

Resource 520 provides a service to requestors 510, such as, for example, data storage and retrieval provided by memory controller 150 within SoC 100, data storage and retrieval provided by memory 230 within system 200, data storage and retrieval provided by a memory within server system 310, etc. Resource 520 includes, inter alia, input queues 522, output queue 524, and fair queuing module 526. Input queues 522 include an input queue for each request stream from requestors 510, i.e., input queue 522-1 for the request stream from requestor 510-1, input queue 522-2 for the request stream from requestor 510-2 and input queue 522-3 for the request stream from requestor 510-3.

Weighted fair queuing module 526 determines the order in which the request messages within each input queue 522 are serviced and the order in which the response messages are provided to output queue 524. The response messages are generally created and provided to output queue 524 in the order in which the request messages are serviced. Weighted fair queuing module 526 may be a software module, a hardware module or a combination thereof.

As discussed above, weighted fair queuing is an extension of fair queuing, in which the distribution of service is provided to requesters 510 on a weighted basis rather than an equal basis. Weighted fair queuing assumes that a resource has a constant data, line or processing rate, R, and, in addition to the weights, $w_i$, considers response message size in order to calculate a virtual finish time for each request message, i.e., an estimation of the time at which processing will finish for the request message.

In many embodiments, block diagram 500 represents a weighted fair queuing method for reading a memory, in which each request message includes a memory read request, and each response message is a memory read response. In the examples depicted in FIGS. 5A, 5B and 5C, input queue 522-1 has received and enqueued three request messages from requestor 510-1, i.e., $r_1 1$, $r_1 2$ and $r_1 3$. Similarly, input queue 522-2 has received and enqueued three request messages from requestor 510-2, i.e., $r_2 1$, $r_2 2$ and $r_2 3$, and input queue 522-3 has received and enqueued three request messages from requestor 510-3, i.e., $r_3 1$, $r_3 2$ and $r_3 3$.

While the length of each request message is generally the same, the lengths of the respective response messages, i.e., $R_1 1$, $R_1 2$, $R_1 3$, $R_2 1$, $R_2 2$, $R_2 3$, $R_3 1$, $R_3 2$ and $R_3 3$, vary in length depending on the amount of data requested.

FIG. 5A depicts a weighted fair queuing technique in which the weight, $w_1$, for the input queue 522-1 is 2, the weight, $w_2$, for the input queue 522-2 is 1, and the weight, $w_3$, for the input queue 522-3 is 1. Table 2 presents the normalized arrival time of each request message, the respective length of each response message, the respective virtual finish time of each request message and the order in which the response messages are enqueued into output queue 524.

Weighted fair queuing module 526 determines the virtual finish time for a request message at time t (i.e., $T_{VF}(t)$) based on the arrival time of the request message (i.e., $T_A(t)$), the virtual finish time of the immediately preceding request message (i.e., $T_{VF}(t-1)$), the length of the response message (i.e., $L_r$), and the weight (i.e., $w_i$) for the input queue, as provided by Equation 2. Weighted fair queuing module 526 then sequentially identifies, selects and enqueues the request message from the requestors 510 based on the virtual finish times.

$$T_{VF}(t)=\text{MAX}(T_A(t),T_{VF}(t-1))+L_r/w_i \qquad \text{Eq. 2.}$$

In this example, the request messages are received in the following order, i.e., $r_1 1$, $r_3 1$, $r_2 1$, $r_1 2$, $r_2 2$, $r_3 2$, $r_2 3$, $r_3 3$ and $r_1 3$, and the response messages are enqueued in the following order, $R_1 1$, $R_2 1$, $R_3 1$, $R_1 2$, $R_2 2$, $R_3 2$, $R_1 3$, $R_2 3$ and $R_3 3$.

TABLE 2

| Request Message | Arrival Time | Response Message | Response Length | $T_{VF}$ | Response Order |
|---|---|---|---|---|---|
| $r_1 1$ | 0 | $R_1 1$ | 4 | 2 | 1 |
| $r_1 2$ | 6 | $R_1 2$ | 6 | 9 | 4 |
| $r_1 3$ | 14 | $R_1 3$ | 4 | 16 | 7 |
| $r_2 1$ | 2 | $R_2 1$ | 4 | 6 | 2 |
| $r_2 2$ | 6 | $R_2 2$ | 4 | 10 | 5 |
| $r_2 3$ | 11 | $R_2 3$ | 6 | 17 | 8 |
| $r_3 1$ | 1 | $R_3 1$ | 6 | 7 | 3 |
| $r_3 2$ | 7 | $R_3 2$ | 5 | 12 | 6 |
| $r_3 3$ | 12 | $R_3 3$ | 5 | 17 | 9 |

FIG. 5B depicts a weighted fair queuing technique in which the weight, $w_1$, for the input queue 522-1 is 1, the weight, $w_2$, for the input queue 522-2 is 2, and the weight, $w_3$, for the input queue 522-3 is 1.

Table 3 presents the normalized arrival time of each request message, the respective length of each response message, the respective virtual finish time of each request message and the order in which the response messages are enqueued into output queue 524.

In this example, the request messages are received in the following order, i.e., $r_1 1$, $r_3 1$, $r_2 1$, $r_1 2$, $r_2 2$, $r_3 2$, $r_2 3$, $r_3 3$ and $r_1 3$, and the response messages are enqueued in the following order, $R_2 1$, $R_1 1$, $R_3 1$, $R_2 2$, $R_1 2$, $R_3 2$, $R_2 3$, $R_3 3$ and $R_1 3$.

TABLE 3

| Request Message | Arrival Time | Response Message | Response Length | $T_{VF}$ | Response Order |
|---|---|---|---|---|---|
| $r_1 1$ | 0 | $R_1 1$ | 4 | 4 | 2 |
| $r_1 2$ | 6 | $R_1 2$ | 6 | 12 | 5 |
| $r_1 3$ | 14 | $R_1 3$ | 4 | 18 | 9 |
| $r_2 1$ | 2 | $R_2 1$ | 4 | 4 | 1 |
| $r_2 2$ | 6 | $R_2 2$ | 4 | 8 | 4 |
| $r_2 3$ | 11 | $R_2 3$ | 6 | 14 | 7 |
| $r_3 1$ | 1 | $R_3 1$ | 6 | 6 | 3 |

TABLE 3-continued

| Request Message | Arrival Time | Response Message | Response Length | $T_{VF}$ | Response Order |
|---|---|---|---|---|---|
| $r_3 2$ | 7 | $R_3 2$ | 5 | 12 | 6 |
| $r_3 3$ | 12 | $R_3 3$ | 5 | 17 | 8 |

FIG. 5C depicts a weighted fair queuing technique in which the weight, $w_1$, for the input queue 522-1 is 1, the weight, $w_2$, for the input queue 522-2 is 1, and the weight, $w_3$, for the input queue 522-3 is 2.

Table 4 presents the normalized arrival time of each request message, the respective length of each response message, the respective virtual finish time of each request message and the order in which the response messages are enqueued into output queue 524.

In this example, the request messages are received in the following order, i.e., $r_1 1$, $r_3 1$, $r_2 1$, $r_1 2$, $r_2 2$, $r_3 2$, $r_2 3$, $r_3 3$ and $r_1 3$, and the response messages are enqueued in the following order, $R_3 1$, $R_1 1$, $R_2 1$, $R_2 2$, $R_1 2$, $R_3 2$, $R_3 3$, $R_2 3$ and $R_1 3$.

TABLE 4

| Request Message | Arrival Time | Response Message | Response Length | $T_{VF}$ | Response Order |
|---|---|---|---|---|---|
| $r_1 1$ | 0 | $R_1 1$ | 4 | 4 | 2 |
| $r_1 2$ | 6 | $R_1 2$ | 6 | 12 | 5 |
| $r_1 3$ | 14 | $R_1 3$ | 4 | 18 | 9 |
| $r_2 1$ | 2 | $R_2 1$ | 4 | 6 | 3 |
| $r_2 2$ | 6 | $R_2 2$ | 4 | 10 | 4 |
| $r_2 3$ | 11 | $R_2 3$ | 6 | 17 | 8 |
| $r_3 1$ | 1 | $R_3 1$ | 6 | 4 | 1 |
| $r_3 2$ | 7 | $R_3 2$ | 5 | 12.5 | 6 |
| $r_3 3$ | 12 | $R_3 3$ | 5 | 15 | 7 |

Weighted fair queueing may be useful for building predictable networks in some systems. However, in complex, resource-sharing systems, simple weighted fair queueing may inadequately address many issues, such as, for example, resource processing rate variability, resource attribute sensitivity, cross-stream interference, etc.

Figure 6:
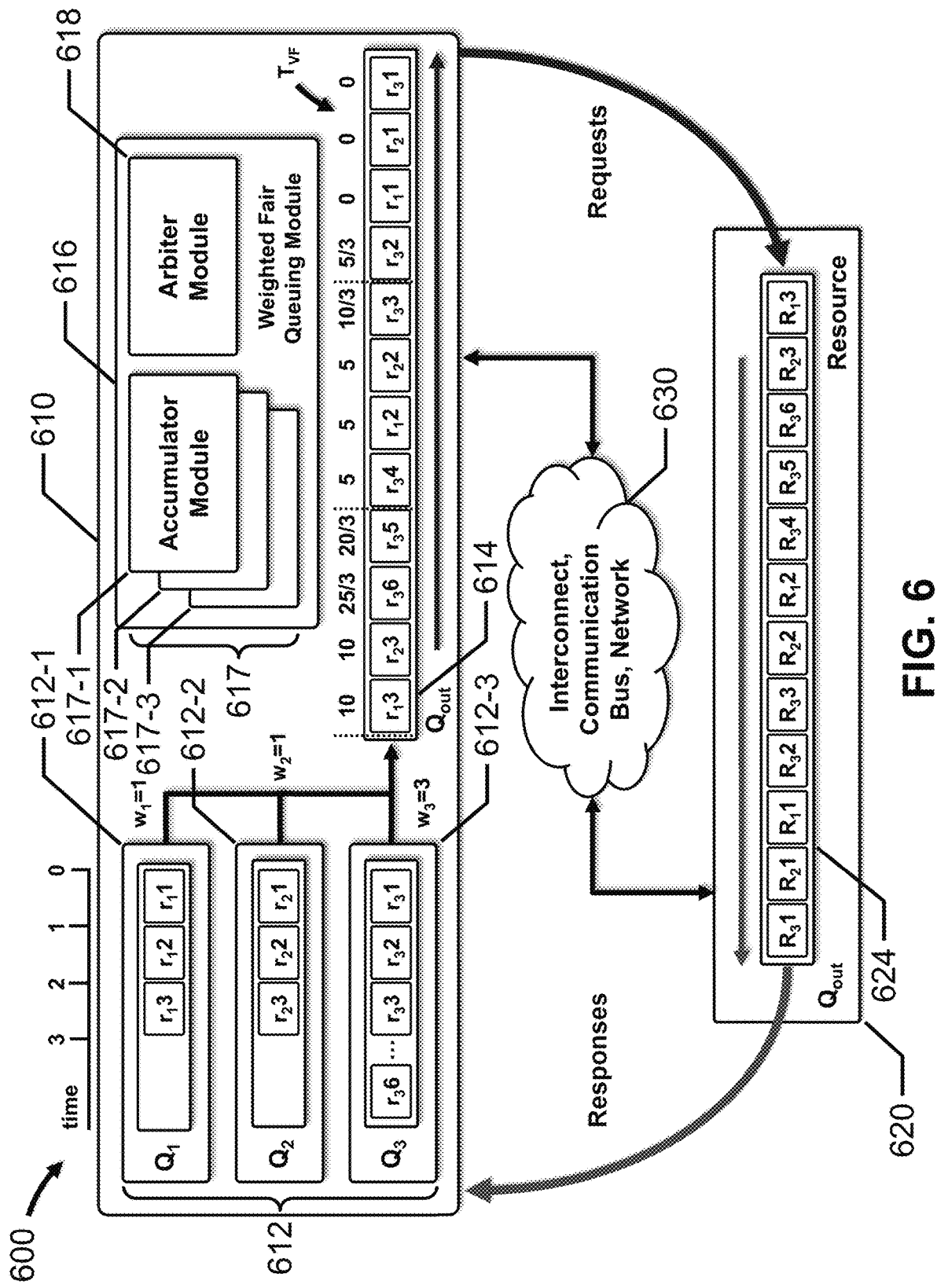
FIG. 6 depicts a block diagram of an enhanced weighted fair queuing technique for a resource, in accordance with embodiments of the present disclosure.

FIG. 6 depicts a block diagram 600 of an enhanced weighted fair queuing technique for a resource, in accordance with embodiments of the present disclosure.

Embodiments of the present disclosure advantageously provide an enhanced weighted fair queuing technique for a resource that stores the virtual finish times at the requestor rather than the resource. Block diagram 600 depicts requestor 610 and resource 620 coupled to interconnect, communication bus or network 630, such as interconnect 110, communication bus 210, network 350, etc.

Requestor 610 may be a single processor or controller within SoC 100, such as, for example, processor 120, specialized processor 130, I/O controller 140, AXI/ACE Lite Slave Device 160, etc., a single processor or controller within system 200, such as, for example, processor 220, I/O interfaces 240, display interface 250, communication interface 260, HAs 270, etc., a single processor or controller within system 300, such as, for example, a single processor or controller within server system 310, a single processor or controller within client system 320, a single processor or controller within system 330, a single processor or controller within embedded system 340, etc.

Generally, a number of threads, processes, applications, etc., execute on requestor 610. Certain threads, processes, applications, etc., may generate a request stream that includes a sequence of request messages for resource 620. Requestor 610 receives and apportions the request messages within each request stream into an associated input queue, determining a virtual finish time for each request message based, at least in part, on input queue weights, determines a single sequence of request messages based on the virtual finish time for each request message, enqueues the single sequence of request messages into an output queue, and sends the single sequence of request messages to resource 620 over interconnect, communication bus or network 630. Resource 620 receives the single sequence of request messages from requestor 610, performs the services requested by the request messages, generates and then returns response messages to requestor 610 over interconnect, communication bus or network 630. Requestor 610 then forwards each response message to the respective thread, process, application, etc., that generated the respective request message. In certain embodiments, the request messages enqueued within the output queue may be rearranged based on various considerations, such as, for example, resource performance, request stream latency, etc.

Requestor 610 includes, inter alia, input queues 612, output queue 614, and weighted fair queuing module 616. More particularly, input queues 612 include an input queue to service the request messages that are received within each request stream, i.e., input queue 612-1 services a first request stream from a thread, process, application, etc. executing on requestor 610, input queue 612-2 services a second request stream from another thread, process, application, etc. executing on requestor 610, input queue 612-3 services a third request stream from another thread, process, application, etc. executing on requestor 610, etc.; other numbers of input queues 612 and request streams are contemplated.

In many embodiments, weighted fair queuing module 616 includes an accumulator module 617 for each input queue 612, and arbiter module 618. Weighted fair queuing module 616 may be a software module, a hardware module or a combination thereof.

Accumulator module 617-1 services input queue 612-1, accumulator module 617-2 services input queue 612-2, and accumulator module 617-3 services input queue 612-3. Each accumulator module 617 includes a counter to track the number of request messages that have been received by the associated input queue 612 and the number of request messages from the associated input queue 612 that have left output queue 614, and predicts the virtual finish time for each request message in the associated input queue 612. The counter is incremented when a new request message is received by the associated input queue 612, and decremented when accumulator module 617 is notified that a request message from the associated input queue 612 has left output queue 614.

Arbiter module 618 selects and orders the request messages from each input queue 612 into a single sequence of request messages based, at least in part, on the virtual finish times determined by accumulator modules 617. Arbiter module 618 then enqueues the single sequence of request messages into output queue 614, which are then sent to resource 620 over interconnect, communication bus or network 630.

Generally, resource 620 provides a service to requestor 610, such as, for example, data storage and retrieval provided by memory controller 150 within SoC 100, data storage and retrieval provided by memory 230 within system 200, data storage and retrieval provided by a memory within server system 310, etc. In many embodiments, block diagram 600 represents an enhanced weighted fair queuing method for reading a memory, in which each request is a memory read request, and each response is a memory read response. Resource 620 generates a response message for each request message received from requestor 610, and may include an output queue 624 to enqueue the response messages as they are generated. In other embodiments, the response messages are simply transmitted to requestor 610 when they are ready.

In the example depicted in FIG. 6, input queue 612-1 has received and enqueued three request messages within the first request stream, i.e., rut, $r_1 2$ and $r_1 3$. Similarly, input queue 612-2 has received and enqueued three request messages within the second request stream, i.e., $r_2 1$, $r_2 2$ and $r_2 3$, and input queue 612-3 has received and enqueued six request messages from the within request stream, i.e., $r_3 1$, $r_3 2$, $r_3 3$, $r_3 4$, $r_3 5$ and $r_3 6$. While the length of each request message is generally the same in input queues 612 and output queue 614, the lengths of the respective response messages in output queue 624, i.e., $R_1 1$, $R_1 2$, $R_1 3$, $R_2 1$, $R_2 2$, $R_2 3$, $R_3 1$, $R_3 2$ and $R_3 3$, may vary in length depending on the amount of data requested. For ease of illustration, the lengths of the respective response messages in output queue 624 are the same. The weight, $w_1$, for the input queue 612-1 is 1, the weight, $w_2$, for the input queue 612-2 is 1, and the weight, $w_3$, for the input queue 612-3 is 3.

Table 5 presents the normalized arrival time of each request message, the respective virtual finish time of each request message and the order in which the response messages are enqueued into output queue 614.

TABLE 5

| Request Message | Arrival Time | Response Message | $T_{VF}$ | Response Order |
|---|---|---|---|---|
| $r_1 1$ | 0 | $R_1 1$ | 0 | 3 |
| $r_1 2$ | 1 | $R_1 2$ | 5 | 7 |
| $r_1 3$ | 2 | $R_1 3$ | 10 | 12 |
| $r_2 1$ | 0 | $R_2 1$ | 0 | 2 |
| $r_2 2$ | 1 | $R_2 2$ | 5 | 6 |
| $r_2 3$ | 2 | $R_2 3$ | 10 | 11 |
| $r_3 1$ | 0 | $R_3 1$ | 0 | 1 |
| $r_3 2$ | 1 | $R_3 2$ | 5/3 | 4 |
| $r_3 3$ | 2 | $R_3 3$ | 10/3 | 5 |
| $r_3 4$ | 3 | $R_3 4$ | 15/3 | 8 |
| $r_3 5$ | 4 | $R_3 5$ | 20/3 | 9 |
| $r_3 6$ | 5 | $R_3 6$ | 25/3 | 10 |

Each accumulator module 617 determines the virtual finish time for a request message at time t (i.e., $T_{VF}(t)$) based on the virtual finish time of the immediately preceding request message (i.e., $T_{VF}(t-1)$) and the weights ($w_i$) for the associated input queue 612, as provided by Equation 2. Arbiter module 618 then sequentially identifies, selects and enqueues the request messages from input queues 612 based on the virtual finish times.

$$T_{VF}(t)=T_{VF}(t-1)+\Sigma w_i/w_i \quad \text{Eq. 2.}$$

For a resource 620 with a data rate of R, the average data rate for each request stream is given by Equation 3, and the average distance between enqueued request messages for each data stream, or the stride for the data stream, is given by Equation 4.

$$R_i=(w_i/\Sigma w_i)*R \quad \text{Eq. 3.}$$

$$S_i=\Sigma w_i/w_i \quad \text{Eq. 4.}$$

For the first stream that is serviced by input queue 612-1, $R_1$ is ⅕ and $S_1$ is 5. For the second stream that is serviced by input queue 612-2, $R_2$ is ⅕ and $S_2$ is 5. For the third stream that is serviced by input queue 612-3, $R_3$ is ⅗ and $S_3$ is 5/3. In other words, in this example, every five messages enqueued into output queue 614 includes one request message from input queue 612-1, one request message from input queue 612-2 and three request messages from input queue 612-3. The request messages are enqueued onto output queue 614 in the following order, i.e., $r_3 1$, $r_2 1$, $r_3 2$, $r_3 3$, $r_2 2$, $r_1 2$, $r_3 4$, $r_3 5$, $r_3 6$, $r_2 3$ and $r_1 3$, and the response messages are enqueued onto output queue 624 in the following order, $R_3 1$, $R_2 1$, $R_1 1$, $R_3 2$, $R_3 3$, $R_2 2$, $R_1 2$, $R_3 4$, $R_3 5$, $R_3 6$, $R_2 3$ and $R_1 3$.

As discussed above, accumulator modules 617 advantageously store the virtual finish time for each request message at requestor 610 rather than resource 620. To prevent overflow, accumulator modules 617 may adjust or decrement the virtual finish times based on notifications from resource 620 that reflect the aggregate processing rate, $R_a$, of resource 620. The adjusted virtual finish times may be viewed as relative finish times and as an indication of virtual queue depth. Arbiter module 618 may detect whether the virtual queue depth exceeds the capacity of resource 620 queue, and, if so, arbiter module 618 may regulate the request messages enqueued into output queue 614 to avoid saturation. In many embodiment, prior to transmission to resource 620, the request messages may be annotated with a coarse indication of the target finish time, e.g., the virtual finish time for that request message, and resource 620 may apply back pressure in order to protect a victim request stream that may need guaranteed ingress to resource 620. Additionally, arbiter module 618 may advantageously distribute excess capacity proportionally over the different request streams.

When resource 620 is a memory system, interference effects may create a variable processing rate, and the memory system scheduler may yield severely compromised aggregate processing if the request messages are serviced according to the simple weighted fair queueing technique.

In many embodiments, a worst-case processing rate may form an upper bound, and accumulator modules 617 may initially operate on a weighted distribution stride calculated from this worst case. Because accumulator modules 617 may initially operate based on the worst case, arbiter module 618 may determine whether a hard guarantee is at risk of being compromised by inspecting the finish time of output queue 614, which indicates both the number of request messages enqueued and execution time (e.g., based on a sum of the virtual finish times), and identifies both bandwidth and latency contract targets.

An accumulator module 617 may be "sized" according to the physical capacity of the respective input queue 612 and the worst case execution time, so that when the accumulator module 617 saturates, additional request messages from the associated request stream may be rejected because the additional request messages will not fit into the virtual queue. Maximum bandwidth limits may thus be applied to aggressor streams. Similarly, the total loading of input queues 612 may be summed, and broader ingress limits may be applied to protect victim streams.

Figure 7:
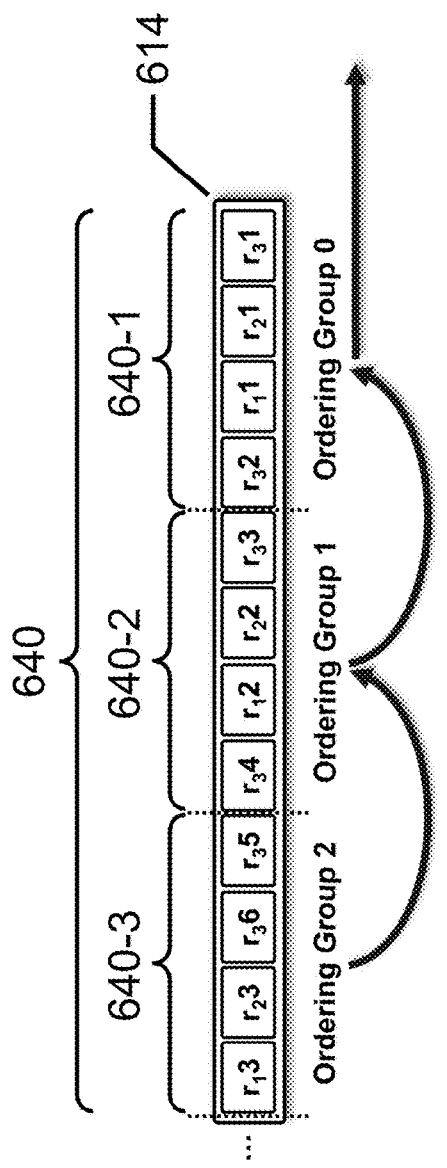
FIG. 7 depicts a block diagram of an output queue for an enhanced weighted fair queueing technique for a resource, in accordance with an embodiment of the present disclosure.

FIG. 7 depicts a block diagram of an output queue for an enhanced weighted fair queueing technique for a resource, in accordance with an embodiment of the present disclosure.

Arbiter module 618 enqueues or inserts request messages into ordering groups 640 within output queue 614. Each ordering group 640 includes a sequence of request messages that reflect a coarse view of position in output queue 614 based on the virtual finish time ($V_{FT}$), and has a particular priority level. Within a particular ordering group 640, arbiter module 618 may reorder the request messages for maximum efficiency, allowing the relative position of the request messages from the request streams to be preserved across ordering groups 640. Request messages from request streams that "run ahead" are relegated to lower priority ordering groups 640.

In the embodiment depicted in FIG. 7, output queue 614 includes three ordering groups, i.e., ordering groups 640-1, 640-2 and 640-3, and each ordering group 640 accommodates four request messages. Other embodiments may include a different number of ordering groups, such as, for example, two, four, five, etc., and/or a different number of request messages for each ordering group 640, such as, for example, two, three, five, six, etc. Request messages $r_3 1$, $r_2 1$, $r_1 1$ and $r_3 2$ have been inserted into ordering group 640-1 (i.e., "Ordering Group 0", highest priority), request messages $r_3 3$, $r_2 2$, $r_1 2$ and $r_3 4$ have been inserted into ordering group 640-2 (i.e., "Ordering Group 1", second highest priority), and request messages $r_3 5$, $r_3 6$, $r_2 3$ and $r_1 3$ have been inserted into ordering group 640-2 (i.e., "Ordering Group 2", third highest priority).

When arbiter module 618 completes processing the request messages within ordering group 640-1, i.e., when all of the request messages within ordering group 640-1 have been sent to resource 620, the request messages remaining in output queue 614 advance one ordering group to the right (as depicted in FIG. 7). For example, when arbiter module 618 finishes processing request messages $r_3 1$, $r_2 1$, and $r_3 2$ within ordering group 640-1, then request messages $r_3 3$, $r_2 2$, $r_1 2$ and $r_3 4$ are advanced from ordering group 640-2 to ordering group 640-1, and request messages $r_3 5$, $r_3 6$, $r_2 3$ and $r_1 3$ are advanced from ordering group 640-3 to ordering group 640-2.

As discussed above, each accumulator module 617 includes a counter that is incremented when a new request message arrives at the associated input queue 612. This counter is then decremented when arbiter module 618 notifies accumulator module 617 that a request message from the associated input queue 612 has left output queue 614. This process ensures that the counters within accumulator modules 617 do not overflow, and that later request messages of a single request stream do not unintentionally "overtake" earlier request messages. If the counters within accumulator modules 617 do overflow, an aggressor request stream may have saturated the available service, and arbiter module 618 may determine whether to stop accepting the request messages from an aggressor request stream based on the occupancy of output queue 614, or, alternatively, whether to permit request messages from the aggressor request stream at a reduced rate to consume any spare capacity.

When an accumulator module 617 indicates that the respective request stream has a processing delay that puts it outside the depth of output queue 614, arbiter module 618 may suppress that request stream to allow the remaining request streams to achieve their respective goals. When there is little activity from the remaining request streams, arbiter module 618 may allow that request stream further access, which advantageously allows more reordering and a higher aggregate processing rate.

Figure 8:
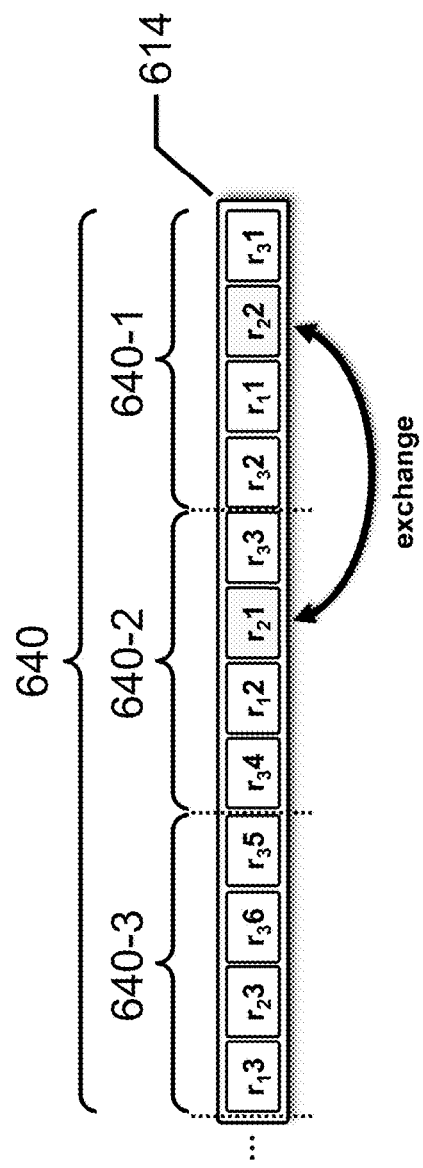
FIG. 8 depicts a block diagram of an output queue for an enhanced weighted fair queueing technique for a resource, in accordance with an embodiment of the present disclosure.

FIG. 8 depicts a block diagram of an output queue for an enhanced weighted fair queueing technique for a resource, in accordance with an embodiment of the present disclosure.

In many embodiments, ordering groups 640 are filled with request messages based on priority. In other words, based on the priority levels described above, ordering group 640-1 is filled before ordering group 640-2, ordering group 640-2 is filled before ordering group 640-3, etc. However, arbiter module 618 may not be able to insert a particular request message in a particular order group 640 due to other scheduling parameters, mitigating factors, etc. Advantageously, arbiter module 618 may exchange request messages from the same input queue 612 (i.e., the same request stream) between different order groups 640.

For example, request message $r_2 1$ was initially inserted into ordering group 640-1 and request message $r_2 2$ was initially inserted into ordering group 640-2 in output queue 614 (as depicted in FIG. 7). Due to a particular scheduling parameter, arbiter module 618 has exchanged request message $r_2 1$ and request message $r_2 2$, so that request message $r_2 1$ is now located into ordering group 640-2 and request message $r_2 2$ is now located into ordering group 640-1 in output queue 614 (as depicted in FIG. 8).

FIG. 9 depicts a block diagram of an output queue for an enhanced weighted fair queueing technique for a resource, in accordance with an embodiment of the present disclosure.

If the stride is set too low (i.e., an under-stride condition) for a particular input queue 612, then arbiter module 618 will attempt to insert more request messages from that input queue 612 into a later (i.e., lower priority) ordering group than might be serviceable. The request message that normally would have been inserted into that particular ordering group may be "skidded" or displaced into the next ordering group to be serviced, which results in a higher latency for the input queue 612 from which the effected request message originated than may be predicted. In response, arbiter module 618 may insert the displaced request message into the next order group to be serviced ahead of any other request messages, which advantageously limits the effected input queue's exposure to increased latency.

For example, rather than initially inserting request message $r_1 1$ into ordering group 640-1, arbiter module 618 initially inserts request message $r_3 2$ into ordering group 640-1 due to a low stride for input queue 612-3. Request message $r_1 1$ is then inserted as the first request message in ordering group 640-2 (as depicted in FIG. 9).

FIG. 10 depicts a block diagram of an output queue for an enhanced weighted fair queueing technique for a resource, in accordance with an embodiment of the present disclosure.

If a request stream has a stride that is over-programmed (i.e., an over-stride condition), that request stream can use the spare capacity of resource 620, as indicated, for example, by a lack of request messages from other request streams in output queue 614. In one embodiment, the request messages from a request stream may be "shuffled forward" to the highest priority order group, which advantageously uses at least a portion of the spare capacity of resource 620 and ensures that the highest priority order group is never empty. For example, after initially inserting request messages $r_3 3$ and $r_3 4$ from input queue 612-3 into ordering group 640-2, arbiter module 618 may relocate request messages $r_3 3$ and $r_3 4$ into ordering group 640-1 due to the spare capacity that is available in ordering group 640-1 (as depicted in FIG. 10). Additionally, after initially inserting request message $r_3 2$ into the last position within ordering group 640-1, arbiter module 618 may first move request message $r_3 2$ forward within ordering group 640-1 before relocating request messages $r_3 3$ and $r_3 4$ into ordering group 640-1, thereby preserving the sequence of request messages from input queue 612-3.

While arbiter module 618 may mitigate over-stride and under-stride behavior, systemic over or under valuation may lead to inefficiencies either through lack of sufficient request messages in output queue 614, or through saturation of inappropriate entries in output queue 614. For example, the occupancy of output queue 614 may be defined as the number of request messages present in output queue 614, while the counter within each accumulator module 617 may define the perceived processing queue or backlog for the respective request stream. If the occupancy is greater than the sum of the counters within accumulator modules 617, then the strides are under-programmed, and if the occupancy is less than the sum of the counters within accumulator modules 617, then the scheduler is ahead, or the strides are over-programmed. The change, or delta, in the occupancy indicates the achieved processing rate, $R_a$, which may be used to scale the stride applied to each request stream.

In certain conditions, such as, for example, a sub-functioning system, rather than degrade all of the processing streams proportionally, arbiter module 618 may protect the processing of one of the request streams to the detriment of the remaining request streams. Advantageously, arbiter module 618 may use the achieved processing rate, $R_a$, to identify reduced service rates and provide a safety-net mechanism that applies a preferential policy to one or more request streams.

Figure 11A:
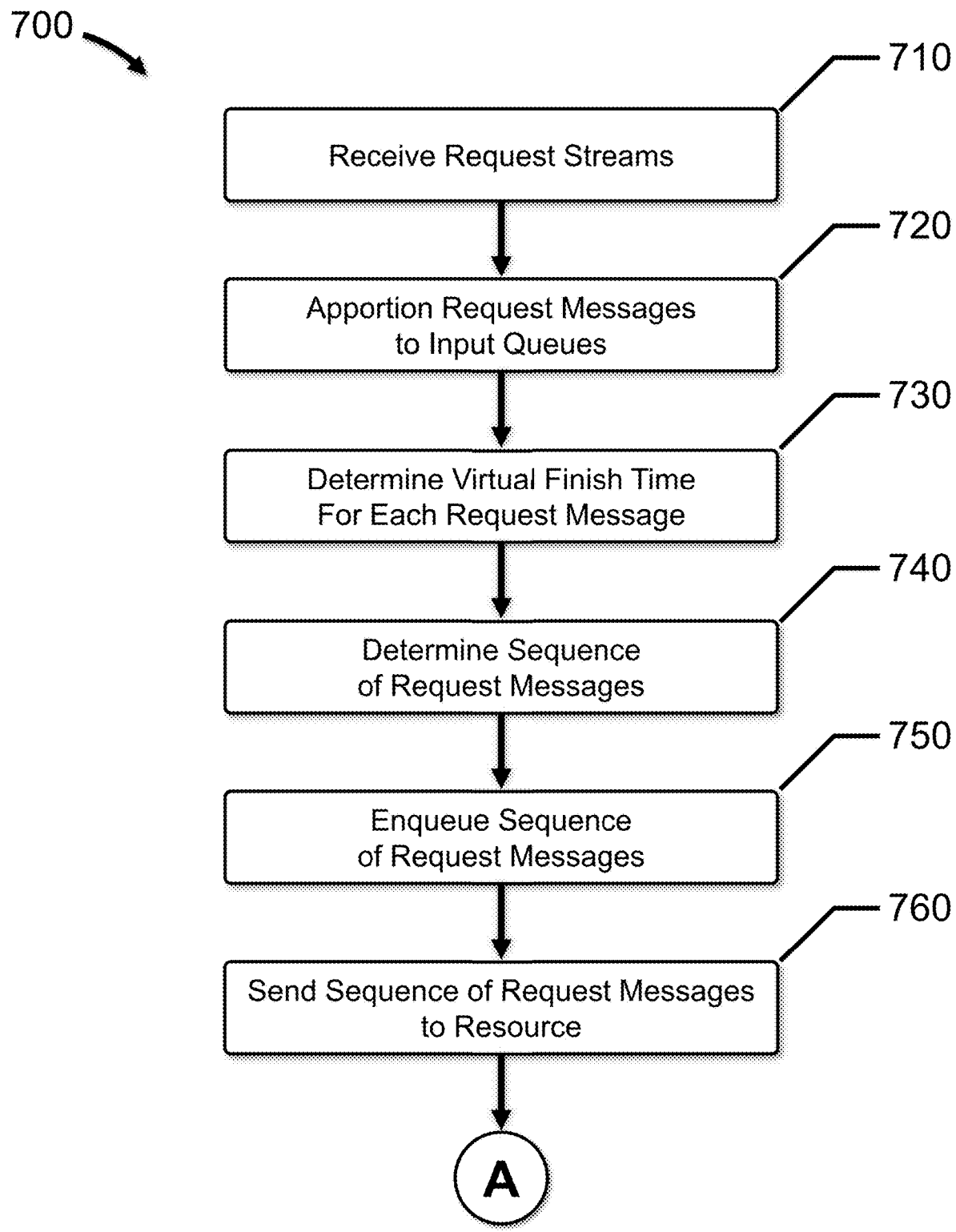
FIG. 11A depicts a flow diagram presenting functionality for an enhanced weighted fair queuing technique for a resource, in accordance with an embodiment of the present disclosure.

FIG. 11A depicts a flow diagram 700 presenting functionality for an enhanced weighted fair queuing technique for a resource, in accordance with an embodiment of the present disclosure. The functionality presented by flow diagram 700 is performed by a requestor, such as, for example, requestor 610 described above.

At 710, a plurality of request streams are received at a requestor, such as, for example, requestor 610 described above. Each request stream includes request messages from a process, thread, application, etc., executing on the requestor. The request messages include requests for service from a resource, such as, for example, resource 620 described above. In many embodiments, the resource may provide access to static or dynamic memory; other types of resources are also contemplated, such as, for example, processing resources, network communications resources, input/output (I/O) resources, file servers, database servers, etc.

At 720, the request messages of each request stream are apportioned to an input queue associated with the request stream. The requestor includes input queues, such as, for example, input queues 612 described above. Each input queue has a weight, as described above.

At 730, a virtual finish time is determined for each request message based, at least in part, on the weights of the input queues. In many embodiments, an accumulator module 617 services each input queue 612, and each accumulator module 617 predicts a virtual finish time for each request message in that input queue 612, as described above. The virtual finish time for a request message at time t (i.e., $T_{VF}(t)$) is based on the virtual finish time of the immediately preceding request message (i.e., $T_{VF}(t-1)$) and the weights ($w_i$) for the associated input queue 612.

At 740, a sequence of request messages is determined based, at least in part, on the virtual finish times of the request messages. In many embodiments, an arbiter module 618 selects and orders the request messages from each input queue 612 into a single sequence of request messages based, at least in part, on the virtual finish times determined by accumulator modules 617, as described above. Generally, arbiter module 618 may regulate the request messages enqueued into output queue 614 to avoid saturation, advantageously distribute excess capacity proportionally over the different request streams, etc., as described above. For example, arbiter module 618 may reorder the request messages for maximum efficiency, allowing the relative position of the request messages from the request streams to be preserved across ordering groups 640.

At 750, the sequence of request messages are enqueued into an output queue. In many embodiments, arbiter module 618 then enqueues the single sequence of request messages into output queue 614.

At 760, the sequence of request messages are sent to a resource over a connection. The sequence of request messages are then sent to resource 620 over interconnect, communication bus or network 630.

Figure 11B:
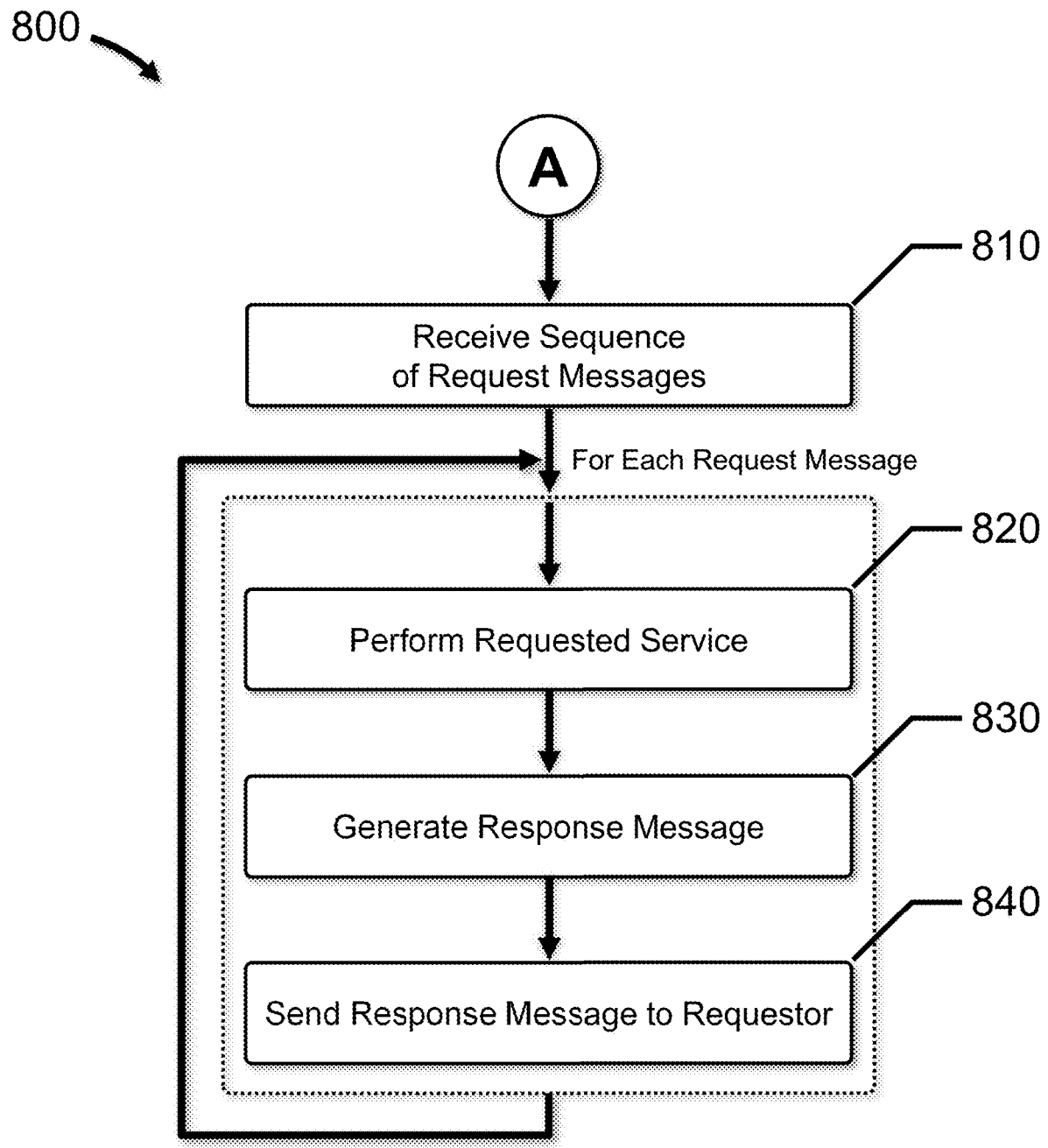
FIG. 11B depicts a flow diagram presenting additional functionality for an enhanced weighted fair queuing technique for a resource, in accordance with an embodiment of the present disclosure.

FIG. 11B depicts a flow diagram 800 presenting additional functionality for an enhanced weighted fair queuing technique for a resource, in accordance with an embodiment of the present disclosure. The functionality presented by flow diagram 700 is performed by a resource, such as, for example, resource 620 described above. In this embodiment, flow proceeds from "A" in flow diagram 700 to "A" in flow diagram 800.

At 810, the sequence of request messages is received from the requestor over the connection.

The functionality at 820, 830 and 840 is repeated for each request message within the sequence of request messages.

At 820, the service requested by the request message is performed. In some embodiments, the service requested is static or dynamic memory access, as described above; other services are also contemplated.

At 830, a response message associated with the request message is generated.

At 840, the response message is sent to the requestor over the connection.

Embodiments of the present disclosure advantageously provide an enhanced weighted fair queuing technique for a resource that stores the virtual finish times at the requestor rather than the resource. The embodiments described above and summarized below are combinable.

In one embodiment, a method for an enhanced weighted fair queuing technique for a resource is provided. A plurality of request streams is received at a requestor, each request stream including request messages from a process executing on the requestor. The request messages of each request stream are apportioned to an input queue associated with the request stream; each input queue has a weight. A virtual finish time is determined for each request message based, at least in part, on the weights of the input queues. A sequence of request messages is determined based, at least in part, on the virtual finish times of the request messages. The sequence of request messages is enqueued into an output queue. The sequence of request messages is sent to a resource, over a connection, which provides a service for each process.

In another embodiment of the method, the method further includes receiving, at the resource from the requestor, the sequence of request messages over the connection, and for each request message within the sequence of request messages, performing the service requested by the request message, generating a response message associated with the request message, and sending, to the requestor, the response message over the connection; and, at the requestor, receiving, from the resource, each response message over the connection, and forwarding each response message to the process from which the associated request message originated.

In another embodiment of the method, the output queue is divided into a plurality of ordering groups; each ordering group has a different priority and a same request message capacity; and said enqueuing the sequence of request messages includes inserting each request message into one of the ordering groups of the output queue.

In another embodiment of the method, sending the sequence of request messages includes sending the request messages enqueued in the ordering group having a highest priority; after a last request message has been sent from the ordering group having the highest priority, for each remaining ordering group, moving the request messages to the ordering group having the next higher priority; and continuing said sending the request messages and said moving the request messages until no request messages remain in the output queue.

In another embodiment of the method, the method further includes after said enqueuing the sequence of request messages, exchanging a request message from a first request stream enqueued within a first ordering group with a request message from the first request stream enqueued within a second ordering group.

In another embodiment of the method, the method further includes after said enqueuing the sequence of request messages into the output queue, exchanging a request message from a first request stream enqueued within a first ordering group with a request message from a second request stream enqueued within a second ordering group.

In another embodiment of the method, the method further includes after said enqueuing the sequence of request messages into the output queue, exchanging a request message from a first request stream enqueued within a first ordering group with a request message from a second request stream enqueued within a second ordering group.

In one embodiment, a system includes a resource, coupled to a connection, including a processor configured to provide a service; and a requestor, coupled to the connection, including a processor configured to receive a plurality of request streams, each request stream including request messages from a process executing on the requestor processor, apportion the request messages of each request stream to an input queue associated with the request stream, each input queue having a weight, determine a virtual finish time for each request message based, at least in part, on the weights of the input queues, determine a sequence of request messages based, at least in part, on the virtual finish times of the request messages, enqueue the sequence of request messages into an output queue, and send, to the resource, the sequence of request messages over the connection, where the service is provided for each process.

In another embodiment of the system, the resource processor is further configured to receive, from the requestor, the sequence of request messages over the connection, and for each request message within the sequence of request messages, perform the service requested by the request message, generate a response message associated with the request message, and send, to the requestor, the response message over the connection; and the requestor processor is further configured to receive, from the resource, each response message over the connection, and forward each response message to the process from which the associated request message originated.

In another embodiment of the system, the output queue is divided into a plurality of ordering groups; each ordering group has a different priority and a same request message capacity; and said enqueue the sequence of request messages includes insert each request message into one of the ordering groups of the output queue.

In another embodiment of the system, send the sequence of request messages includes send the request messages enqueued in the ordering group having a highest priority; after a last request message has been sent from the ordering group having the highest priority, for each remaining ordering group, move the request messages to the ordering group having the next higher priority; and continue said send the request messages and said move the request messages until no request messages remain in the output queue.

In another embodiment of the system, the requestor processor is further configured to after said enqueue the sequence of request messages, exchange a request message from a first request stream enqueued within a first ordering group with a request message from the first request stream enqueued within a second ordering group.

In another embodiment of the system, the requestor processor is further configured to after said enqueue the sequence of request messages into the output queue, exchange a request message from a first request stream enqueued within a first ordering group with a request message from a second request stream enqueued within a second ordering group.

In another embodiment of the system, the requestor processor is further configured to after said enqueue the sequence of request messages into the output queue, move a request message from a first request stream enqueued within a first ordering group to a second ordering group having a higher priority than the first ordering group.

In one embodiment, a non-transitory computer-readable medium is provided that stores instructions that, when executed by a processor of a requestor, cause the processor to receive a plurality of request streams, each request stream including request messages from a process executing on the processor; apportion the request messages of each request stream to an input queue associated with the request stream, each input queue having a weight; determine a virtual finish time for each request message based, at least in part, on the weights of the input queues; determine a sequence of request messages based, at least in part, on the virtual finish times of the request messages; enqueue the sequence of request messages into an output queue; and send, to a resource, the sequence of request messages over a connection, where the resource provides a service for each process.

In another embodiment of the non-transitory computer-readable medium, the resource is configured to receive, from the requestor, the sequence of request messages over the connection, and for each request message within the sequence of request messages, perform the service requested by the request message, generate a response message associated with the request message, and send, to the requestor, the response message over the connection; and the instructions further cause the processor to receive, from the resource, each response message over the connection, and forward each response message to the process from which the associated request message originated.

In another embodiment of the non-transitory computer-readable medium, the output queue is divided into a plurality of ordering groups; each ordering group has a different priority and a same request message capacity; and said enqueue the sequence of request messages includes insert each request message into one of the ordering groups of the output queue.

In another embodiment of the non-transitory computer-readable medium, send the sequence of request messages includes send the request messages enqueued in the ordering group having a highest priority; after a last request message has been sent from the ordering group having the highest priority, for each remaining ordering group, move the request messages to the ordering group having the next higher priority; and continue said send the request messages and said move the request messages until no request messages remain in the output queue.

In another embodiment of the non-transitory computer-readable medium, the instructions further cause the processor to after said enqueue the sequence of request messages, exchange a request message from a first request stream enqueued within a first ordering group with a request message from the first request stream enqueued within a second ordering group.

In another embodiment of the non-transitory computer-readable medium, the instructions further cause the processor to after said enqueue the sequence of request messages into the output queue, exchange a request message from a first request stream enqueued within a first ordering group with a request message from a second request stream enqueued within a second ordering group; or after said enqueue the sequence of request messages into the output queue, move a request message from a first request stream enqueued within a first ordering group to a second ordering group having a higher priority than the first ordering group.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "some embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method, comprising:
   at a requestor:
   receiving a plurality of request streams, each request stream including request messages from a process executing on the requestor;
   apportioning the request messages of each request stream to an input queue associated with the request stream, each input queue having a weight;
   determining a virtual finish time for each request message based, at least in part, on the weights of the input queues;
   determining a sequence of request messages based, at least in part, on the virtual finish times of the request messages;
   enqueuing the sequence of request messages into an output queue; and sending, to a resource, the sequence of request messages over a connection,
where the resource provides a service for each process.

2. The method according to claim 1, further comprising:
at the resource:
receiving, from the requestor, the sequence of request messages over the connection;
for each request message within the sequence of request messages:
performing the service requested by the request message,
generating a response message associated with the request message, and
sending, to the requestor, the response message over the connection; and
at the requestor:
receiving, from the resource, each response message over the connection; and
forwarding each response message to the process from which the associated request message originated.

3. The method according to claim 1, where:
the output queue is divided into a plurality of ordering groups;
each ordering group has a different priority and a same request message capacity; and
said enqueuing the sequence of request messages includes inserting each request message into one of the ordering groups of the output queue.

4. The method according to claim 3, where said sending the sequence of request messages includes:
sending the request messages enqueued in the ordering group having a highest priority;
after a last request message has been sent from the ordering group having the highest priority, for each remaining ordering group:
moving the request messages to the ordering group having the next higher priority; and
continuing said sending the request messages and said moving the request messages until no request messages remain in the output queue.

5. The method according to claim 3, further comprising:
after said enqueuing the sequence of request messages, exchanging a request message from a first request stream enqueued within a first ordering group with a request message from the first request stream enqueued within a second ordering group.

6. The method according to claim 3, further comprising:
after said enqueuing the sequence of request messages into the output queue, exchanging a request message from a first request stream enqueued within a first ordering group with a request message from a second request stream enqueued within a second ordering group.

7. The method according to claim 3, further comprising:
after said enqueuing the sequence of request messages into the output queue, moving a request message from a first request stream enqueued within a first ordering group to a second ordering group having a higher priority than the first ordering group.

8. A system, comprising:
a resource, coupled to a connection, including a processor configured to provide a service; and
a requestor, coupled to the connection, including a processor configured to:
receive a plurality of request streams, each request stream including request messages from a process executing on the requestor processor,
apportion the request messages of each request stream to an input queue associated with the request stream, each input queue having a weight,
determine a virtual finish time for each request message based, at least in part, on the weights of the input queues,
determine a sequence of request messages based, at least in part, on the virtual finish times of the request messages,
enqueue the sequence of request messages into an output queue, and
send, to the resource, the sequence of request messages over the connection,
where the service is provided for each process.

9. The system according to claim 8, where:
the resource processor is further configured to:
receive, from the requestor, the sequence of request messages over the connection,
for each request message within the sequence of request messages:
perform the service requested by the request message,
generate a response message associated with the request message, and
send, to the requestor, the response message over the connection; and
the requestor processor is further configured to:
receive, from the resource, each response message over the connection, and
forward each response message to the process from which the associated request message originated.

10. The system according to claim 8, where:
the output queue is divided into a plurality of ordering groups;
each ordering group has a different priority and a same request message capacity; and
said enqueue the sequence of request messages includes insert each request message into one of the ordering groups of the output queue.

11. The system according to claim 10, where said send the sequence of request messages includes:
send the request messages enqueued in the ordering group having a highest priority;
after a last request message has been sent from the ordering group having the highest priority, for each remaining ordering group:
move the request messages to the ordering group having the next higher priority; and
continue said send the request messages and said move the request messages until no request messages remain in the output queue.

12. The system according to claim 10, where the requestor processor is further configured to:
after said enqueue the sequence of request messages, exchange a request message from a first request stream enqueued within a first ordering group with a request message from the first request stream enqueued within a second ordering group.

13. The system according to claim 10, where the requestor processor is further configured to:
after said enqueue the sequence of request messages into the output queue, exchange a request message from a first request stream enqueued within a first ordering group with a request message from a second request stream enqueued within a second ordering group.

14. The system according to claim 10, where the requestor processor is further configured to:

after said enqueue the sequence of request messages into the output queue, move a request message from a first request stream enqueued within a first ordering group to a second ordering group having a higher priority than the first ordering group.

15. A non-transitory computer-readable medium storing instructions that, when executed by a processor of a requestor, cause the processor to:
   receive a plurality of request streams, each request stream including request messages from a process executing on the processor;
   apportion the request messages of each request stream to an input queue associated with the request stream, each input queue having a weight;
   determine a virtual finish time for each request message based, at least in part, on the weights of the input queues;
   determine a sequence of request messages based, at least in part, on the virtual finish times of the request messages;
   enqueue the sequence of request messages into an output queue; and
   send, to a resource, the sequence of request messages over a connection,
   where the resource provides a service for each process.

16. The non-transitory computer-readable medium according to claim 15, where:
   the resource is configured to:
      receive, from the requestor, the sequence of request messages over the connection, and
      for each request message within the sequence of request messages:
         perform the service requested by the request message,
         generate a response message associated with the request message, and
         send, to the requestor, the response message over the connection; and
   the instructions further cause the processor to:
      receive, from the resource, each response message over the connection, and
      forward each response message to the process from which the associated request message originated.

17. The non-transitory computer-readable medium according to claim 15, where:
   the output queue is divided into a plurality of ordering groups;
   each ordering group has a different priority and a same request message capacity; and
   said enqueue the sequence of request messages includes insert each request message into one of the ordering groups of the output queue.

18. The non-transitory computer-readable medium according to claim 17, where said send the sequence of request messages includes:
   send the request messages enqueued in the ordering group having a highest priority;
   after a last request message has been sent from the ordering group having the highest priority, for each remaining ordering group:
      move the request messages to the ordering group having the next higher priority; and
   continue said send the request messages and said move the request messages until no request messages remain in the output queue.

19. The non-transitory computer-readable medium according to claim 17, where the instructions further cause the processor to:
   after said enqueue the sequence of request messages, exchange a request message from a first request stream enqueued within a first ordering group with a request message from the first request stream enqueued within a second ordering group.

20. The non-transitory computer-readable medium according to claim 17, where the instructions further cause the processor to:
   after said enqueue the sequence of request messages into the output queue, exchange a request message from a first request stream enqueued within a first ordering group with a request message from a second request stream enqueued within a second ordering group; or
   after said enqueue the sequence of request messages into the output queue, move a request message from a first request stream enqueued within a first ordering group to a second ordering group having a higher priority than the first ordering group.

* * * * *